US012248807B2

(12) United States Patent
Sahita et al.

(10) Patent No.: US 12,248,807 B2
(45) Date of Patent: Mar. 11, 2025

(54) METHODS, APPARATUS, SYSTEMS, AND INSTRUCTIONS TO MIGRATE PROTECTED VIRTUAL MACHINES

(71) Applicant: INTEL CORPORATION, Santa Clara, CA (US)

(72) Inventors: Ravi Sahita, Portland, OR (US); Dror Caspi, Kiryat Yam (IL); Vincent Scarlata, Beaverton, OR (US); Sharon Yaniv, Kiryat Tivon (IL); Baruch Chaikin, D.N. Misagv (IL); Vedvyas Shanbhogue, Austin, TX (US); Jun Nakajima, San Ramon, CA (US); Arumugam Thiyagarajah, Folsom, CA (US); Sean Christopherson, Portland, OR (US); Haidong Xia, Folsom, CA (US); Vinay Awasthi, San Francisco, CA (US); Isaku Yamahata, Urayasu (JP); Wei Wang, Shanghai (CN); Thomas Adelmeyer, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 17/134,339

(22) Filed: Dec. 26, 2020

(65) Prior Publication Data

US 2022/0206842 A1 Jun. 30, 2022

(51) Int. Cl.
*G06F 9/48* (2006.01)
*G06F 9/38* (2018.01)
(Continued)

(52) U.S. Cl.
CPC .......... *G06F 9/4856* (2013.01); *G06F 9/3836* (2013.01); *G06F 9/45558* (2013.01);
(Continued)

(58) Field of Classification Search
CPC .. G06F 9/4856; G06F 9/3836; G06F 9/45558; G06F 21/602; G06F 2009/4557;
(Continued)

(56) References Cited

U.S. PATENT DOCUMENTS 6,549,959 B1 * 4/2003 Yates .................. G06F 9/45558
711/146
9,712,503 B1 7/2017 Ahmed et al.
(Continued)

FOREIGN PATENT DOCUMENTS

EP 3408780 A1 12/2018
WO 2011/049574 A1 4/2011
WO 2017/129659 A1 8/2017

OTHER PUBLICATIONS

AMD, "AMD Memory Encryption Tutorial", ISCA 2016, Jun. 19, 2016, 82 pages.
(Continued)

*Primary Examiner* — Kevin L Young
*Assistant Examiner* — Phuong N Hoang
(74) *Attorney, Agent, or Firm* — Nicholson De Vos Webster & Elliott LLP

(57) ABSTRACT

Techniques for migration of a source protected virtual machine from a source platform to a destination platform are descried. A method of an aspect includes enforcing that bundles of state, of a first protected virtual machine (VM), received at a second platform over a stream, during an in-order phase of a migration of the first protected VM from a first platform to the second platform, are imported to a second protected VM of the second platform, in a same order that they were exported from the first protected VM. Receiving a marker over the stream marking an end of the in-order phase. Determining that all bundles of state exported from the first protected VM prior to export of the marker have been imported to the second protected VM. Starting an
(Continued)

out-of-order phase of the migration based on the determination that said all bundles of the state exported have been imported.

26 Claims, 18 Drawing Sheets

(51) Int. Cl.
    *G06F 9/455*         (2018.01)
    *G06F 21/60*        (2013.01)

(52) U.S. Cl.
    CPC .... *G06F 21/602* (2013.01); *G06F 2009/4557* (2013.01); *G06F 2009/45587* (2013.01); *G06F 2009/45591* (2013.01)

(58) Field of Classification Search
    CPC . G06F 2009/45587; G06F 2009/45591; G06F 21/53; G06F 21/64; G06F 2009/45562
    See application file for complete search history.

(56) References Cited

U.S. PATENT DOCUMENTS

| | | | |
|---|---|---|---|
| 10,649,911 B2 | 5/2020 | Khosravi et al. | |
| 10,671,737 B2 | 6/2020 | Durham et al. | |
| 10,761,996 B2 | 9/2020 | Sahita et al. | |
| 10,810,321 B2 | 10/2020 | Sahita et al. | |
| 2007/0094719 A1* | 4/2007 | Scarlata | G06F 21/577 726/9 |
| 2012/0278804 A1* | 11/2012 | Narayanasamy | H04L 47/15 718/1 |
| 2015/0029543 A1* | 1/2015 | Morita | H04N 1/00244 358/1.15 |
| 2016/0188353 A1* | 6/2016 | Shu | G06F 9/45558 718/1 |
| 2016/0378688 A1 | 12/2016 | Rozas et al. | |
| 2019/0087575 A1 | 3/2019 | Sahita et al. | |
| 2019/0227878 A1* | 7/2019 | Agarwal | G06F 8/658 |
| 2020/0201648 A1* | 6/2020 | Memon | G06F 9/3851 |

OTHER PUBLICATIONS

AMD, "Secure Encrypted Virtualization API Version 0.24", Technical Preview, Advanced Micro Devices, Revision: 3.24, Apr. 2020, 122 pages.
AMD, "SEV Secure Nested Paging Firmware ABI Specification", Advanced Micro Devices, Revision:0.8, Aug. 2020, 108 pages.
Gu et al., "Secure Live Migration of SGX Enclaves on Untrusted Cloud", 47th Annual IEEE/IFIP International Conference on Dependable Systems and Networks (DSN, 2017, 12 pages.
Gustafsson, Erik, "Optimizing Total Migration Time in Virtual Machine Live Migration", Department of Information Technology, Mar. 2013, 47 pages.
Hetzelt et al., "Security Analysis of Encrypted Virtual Machines", ACM, Jul. 26, 2017, 14 pages.
Intel, "Architecture Specification: Intel(Registered) Trust Domain Extensions (Intel Registered TDX) Module", Sep. 2020, 285 pages.
Intel, Guest-Host-Communication Interface(GHCI) for Intel (Registered) Trust Domain Extensions (Intel registered TDX), Sep. 2020, 48 pages.
Intel, "Intel(registered) Trust Domain CPU Architectural Extensions", Sep. 2020, 40 pages.
Intel, "Intel(registered) Trust Domain Extensions", White Paper, Aug. 2020, 9 pages.
Intel, "Intel(registered) Trust Domain Extensions—SEAM Loader(SEAMLDER) Interface Specification", Sep. 2020, 20 pages.
Intel, "Intel, Intel(registered) TDX Virtual Firmware Design Guide", Document No. 344991-001US, Oct. 2020, 55 pages.
Nitu et al., "Swift Birth and Quick Death: Enabling Fast Parallel Guest Boot and Destruction in the Xen Hypervisor", ACM, Apr. 8-9, 2017, 14 pages.
European Search Report and Search Opinion, EP App. No. 21198666. 6, Mar. 11, 2022, 8 pages.

* cited by examiner

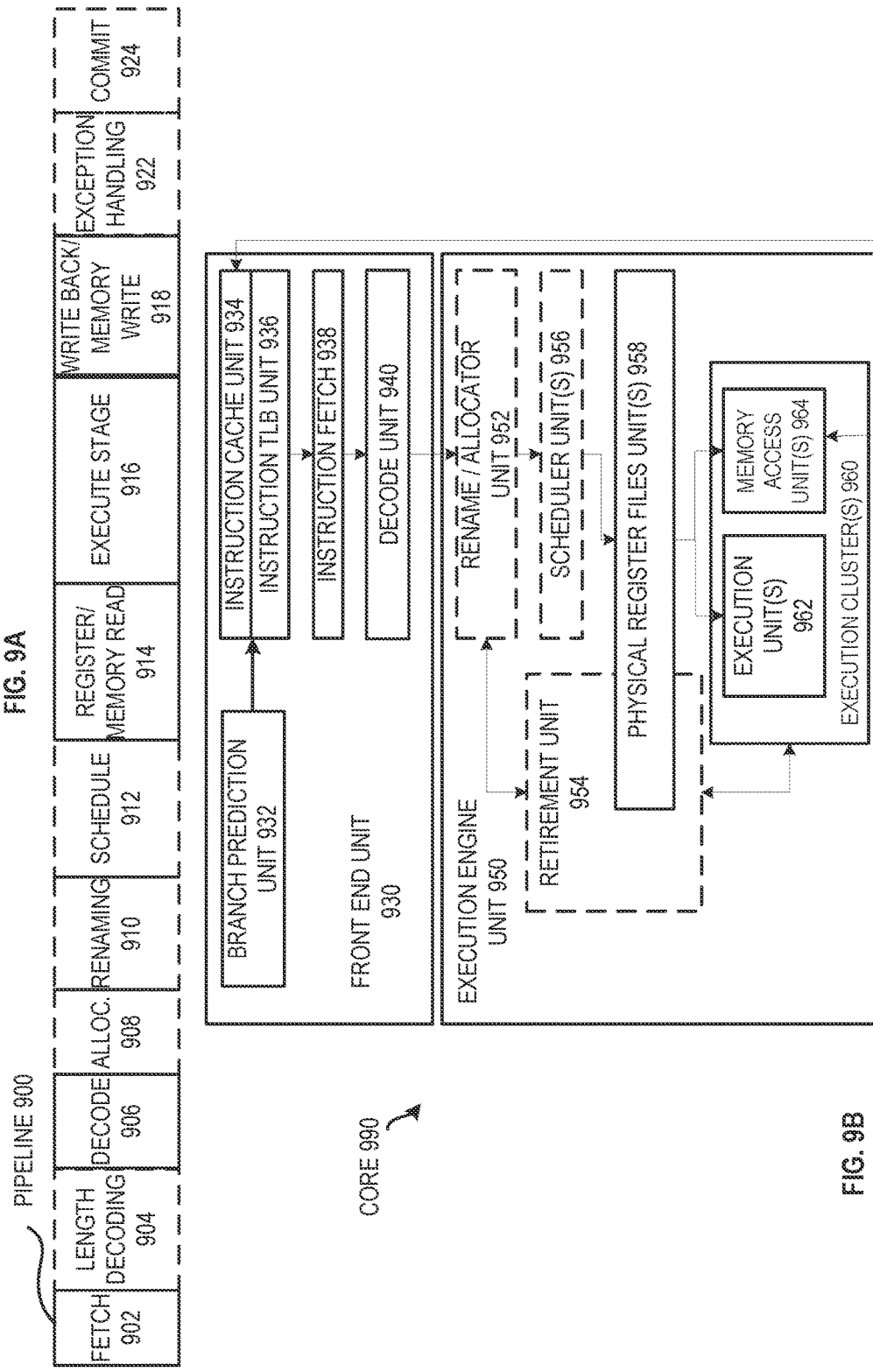
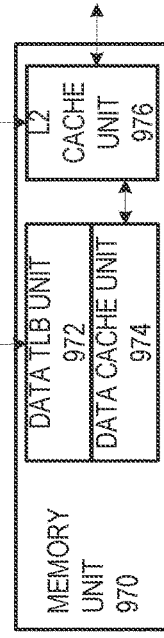
FIG. 9A
FIG. 9B

METHODS, APPARATUS, SYSTEMS, AND INSTRUCTIONS TO MIGRATE PROTECTED VIRTUAL MACHINES

BACKGROUND

Technical Field

Embodiments described herein generally relate to virtualization. In particular, embodiments described herein generally relate to migration of protected virtual machines.

Background Information

Modern processing devices employ disk encryption to protect data at rest. However, data in memory is in plaintext and vulnerable to attacks. Attackers can use a variety of techniques including software and hardware-based bus scanning, memory scanning, hardware probing etc. to retrieve data from memory. This data from memory could include sensitive data for example, privacy-sensitive data, intellectual property-sensitive data, cryptographic keys used for file encryption or communication, and the like. Moreover, a current trend in computing is the movement of data and enterprise workloads into the cloud by utilizing virtualization-based hosting services provided by cloud service providers (CSPs). This further exacerbates the exposure of the data. Customers or so-called tenants of the CSPs are requesting better security and isolation solutions for their workloads. Specifically, customers are seeking solutions that enable the operation of CSP-provided software outside of a Trusted Computing Base (TCB) of the tenant's software. The TCB of a system refers to a set of hardware, firmware, and/or software components that have an ability to influence the trust for the overall operation of the system.

BRIEF DESCRIPTION OF THE DRAWINGS

The invention may best be understood by referring to the following description and accompanying drawings that are used to illustrate embodiments. In the drawings:

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

DETAILED DESCRIPTION OF EMBODIMENTS

The present disclosure relates to methods, apparatus, systems, and non-transitory computer-readable storage media to migrate a protected virtual machine (VM) from a source platform to a destination platform. In the following description, numerous specific details are set forth (e.g., specific application binary interface (ABI) primitives, specific operations and sequences of operations, specific Intel® Trust Domain Extensions (Intel® TDX) implementation details, and the like). However, embodiments may be practiced without these specific details. In other instances, well-known circuits, structures and techniques have not been shown in detail to avoid obscuring the understanding of the description.

I. Migration of Protected Virtual Machines

Figure 1:
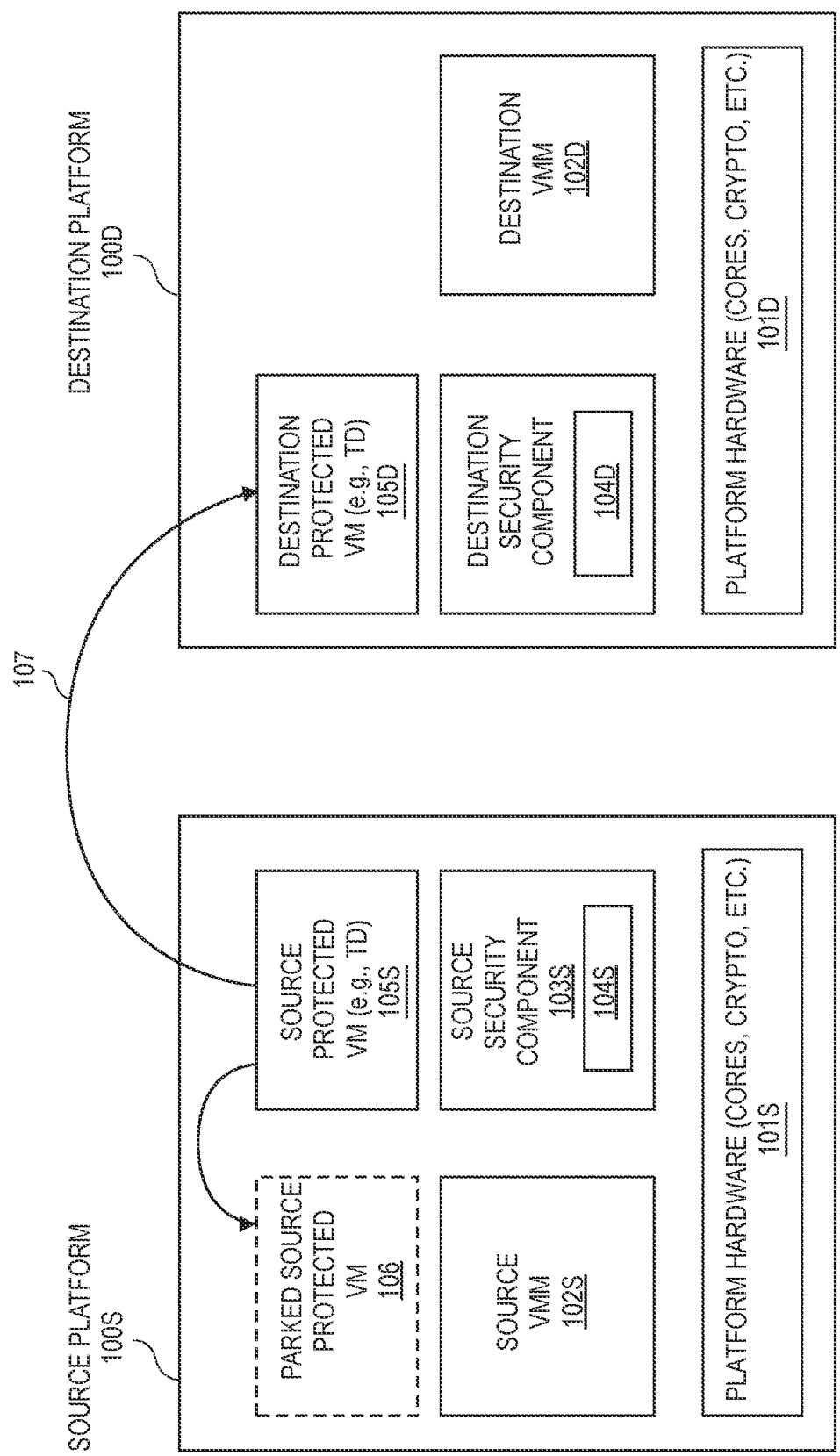
FIG. 1 is a block diagram illustrating migration of a protected virtual machine from a source platform to a destination platform.

FIG. 1 is a block diagram illustrating migration 107 of a source protected virtual machine (VM) 105S from a source platform 100S to a destination platform 100D. The source and destination platforms may represent servers (e.g., virtualization servers like the virtualization server 200 of FIG. 2), or other computer systems similar to those disclosed herein. In general, the platforms may represent any of various different platforms on which virtual machines are known to run. The source platform has platform hardware 101S and the destination platform has platform hardware 101D. Examples of such hardware include cores, caches, registers, translation lookaside buffers (TLBs), memory management units (MMUs), a cryptographic engine (crypto), other processor hardware, input/output devices, main memory, secondary memory, other system-level hardware, and other hardware found in processors and computer systems (e.g., as shown in the other processors and computer systems disclosed herein).

The source platform has a source virtual machine manager (VMM) 102S and the destination platform has a destination VMM 102D. The VMMs are sometimes referred to as hypervisors. The source VMM may create and manage one or more VMs, including the source protected VM, in ways that are known in the art. Similarly, the destination VMM may create and manage, support, or otherwise interact with one or more VMs, including the destination protected VM, once it has been migrated.

The source platform has a source security component 103S and the destination platform has a destination security component 103D. In various embodiments, the source and destination security components may be security-services modules (e.g., TDX modules), security processors (e.g., platform security processors), processor microcode, a security firmware components, or other security components. The security components may be implemented in hardware, firmware, software, or any combination thereof. The source and destination security components may be operative to provide protection or security to the source and destination protected VMs, respectively. In some embodiments, this may include protecting the protected VMs from software not within the trusted computing base (TCB) of the protected VMs, including the source and destination VMMs. Such approaches may rely on encryption, hardware isolation, or other approaches. As used herein, a protected VM may represent an encrypted, isolated, or otherwise protected VM whose state is not-accessible to the VMM.

The source and destination security components 103S, 103D may respectively use various different types of approaches known in the arts to protect the source and destination protected VMs 105S, 105D. One example of such an approach is a VM using Intel Multi-Key Total Memory Encryption (MKTME), which uses encryption to protect the data and code of the VM. MKTME supports total memory encryption (TME) in that it allows software to use one or more or separate keys for encryption of volatile or persistent memory. Another example is a trust domain (TD) in Intel® Trust Domain Extensions (Intel® TDX), which uses both encryption, integrity protection, and hardware isolation to protect the data and code of the VM against software and hardware attacks from elements outside the TCB. When MKTME is used with TDX, it provides confidentiality via separate keys for memory contents of different TDs such that the TD keys cannot be operated upon by the untrusted VMM. MKTME may be used with and without TDX. The TD is an example of an encrypted and hardware isolated VM. Another example is an encrypted VM in AMD Secure Encrypted Virtualization (SEV), which uses encryption to protect the data and code of the VM. Yet another example, is an encrypted VM in AMD SEV Secure Nested Paging (SEV-SNP), which uses encryption and hardware isolation to protect the data and code of the VM. One more example, is a secure enclave in Intel® Software Guard Extensions (Intel® SGX), which uses encryption, hardware isolation, replay protections, and other protections to protect code and data of a secure enclave. Each of MKTME, TDX, SEV, SEV-SNP, and SGX are able to provide encrypted workloads (VMs or applications) with pages that are encrypted with a key that is kept secret in hardware from the VMM, hypervisor or host operating system. These are just a few examples. Those skilled in the art, and having the benefit of the present disclosure, will appreciated that the embodiments disclosed herein may also be applied to other techniques known in the art or developed in the future.

The source security component has a source migration component 104S, and the destination security component has a destination migration component 104D. The source and destination migration components may be operative to assist with the migration. The source and destination migration components may be implemented in hardware, firmware, software, or any combination thereof. The migration may move the source protected VM from the source platform to become a destination protected VM on the destination platform. Such migration may be performed for various different reasons, such as, for example, to help with capacity planning/load balancing, to allow a platform to be serviced, maintenance, or upgraded, to allow a microcode, firmware or software patch to be installed on a platform, to help meet customer service-level agreement (SLA) objectives, or the like. In some embodiments, the source security component 103S and/or the source migration component 104S may also optionally be operative to "park" the source protected VM 105S as a parked source VM 106. To park the source protected VM broadly refers to stopping its execution and preserving it on the source platform (e.g., temporarily deactivating it or stopping it and putting it to rest on the source platform). As another option, in some embodiments, the source protected VM may optionally be migrated more than once to allow cloning via live migration (e.g., in some cases if a migration policy of the source protected VM permits it and otherwise not).

The migration 107 may either be a so-called cold migration or a so-called live migration. In a cold migration, the source protected VM 105S may be suspended or stopped for most if not all the duration of the migration and the destination protected VM may be resumed after the migration has completed. In live migration, the source protected VM may remain executing during much of the migration, and then suspended or stopped while the last part of the migration is completed (which may be shorter than network timeout for session-oriented protocols like TCP/IP). Commonly, the destination protected VM may be resumed at some point after the source protected VM has been stopped, but prior to completion of the migration. Live migration is sometimes favored for the aspect that the downtime may be reduced by allowing one of the protected VMs to continue to operate while much if not most of the migration progresses.

II. Trust Domains as Example of Protected Virtual Machines

As discussed above, in some embodiments, the protected VMs may be trust domains (TDs) in Intel® Trust Domain Extensions (TDX). TDX is an Intel technology that extends Virtual Machines Extensions (VMX) and Multi-Key Total Memory Encryption (MKTME) with a new kind of virtual machine guest called Trust Domain (TD). A TD runs in a CPU mode which protects the confidentiality of its memory contents and its CPU state from any other software, including the hosting VMM, unless explicitly shared by the TD itself. TDX is built on top of Secure Arbitration Mode (SEAM), which is a CPU mode and extension of VMX ISA. The Intel TDX module, running in SEAM mode, serves as an intermediary between the host VMM and the guest TDs. The host VMM is expected to be Intel TDX-aware. A host VMM can launch and manage both guest TDs and legacy guest VMs. The host VMM may maintain legacy functionality from the legacy VMs perspective. It may be restricted mainly regarding the TDs it manages.

TDX may help to provide confidentiality (and integrity) for customer (tenant) software executing in an untrusted CSP infrastructure. The TD architecture, which can be a System-on-Chip (SoC) capability, provides isolation between TD workloads and CSP software, such as a VMM of the CSP. Components of the TD architecture can include 1) memory encryption via a MKTME engine, 2) a resource management capability such as a VMM, and 3) execution state and memory isolation capabilities in the processor provided via a TDX-Module-managed Physical Address Meta-data Table (PAMT) and via TDX-Module-enforced confidential TD control structures. The TD architecture provides an ability of the processor to deploy TDs that leverage the MKTME engine, the PAMT, the Secure (integrity-protected) EPT (Extended Page Table) and the access-controlled confidential TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a VM running on top of a VMM along with other ring-3 applications, for example). Each TD may operate independently of other TDs in the system and may use logical processor(s), memory, and I/O assigned by the VMM on the platform. Each TD may be cryptographically isolated in memory using at least one exclusive encryption key of the MKTME engine to encrypt the memory (holding code and/or data) associated with the TD.

In implementations of the disclosure, the VMM in the TD architecture may act as a host for the TDs and may have full control of the cores and other platform hardware. The VMM may assign software in a TD with logical processor(s). The VMM, however, may be restricted from accessing the TD's execution state on the assigned logical processor(s). Similarly, the VMM assigns physical memory and I/O resources to the TDs, but is not privy to access the memory state of a TD due to the use of separate encryption keys enforced by the CPUs per TD, and other integrity and replay controls on memory. Software executing in a TD operates with reduced privileges so that the VMM can retain control of platform resources. However, the VMM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset sub-systems that implementations of the disclosure may avoid. In some cases, the TD architecture may provide isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random access memory (DRAM), or storage class memory (SCM)-based memory, such as Non-Volatile Dual In-line Memory Module (NV-DIMM). As such, implementations of the disclosure allow software to take advantage of performance benefits, such as NVDIMM direct access storage (DAS) mode for SCM, without compromising platform security requirements.

Figure 2:
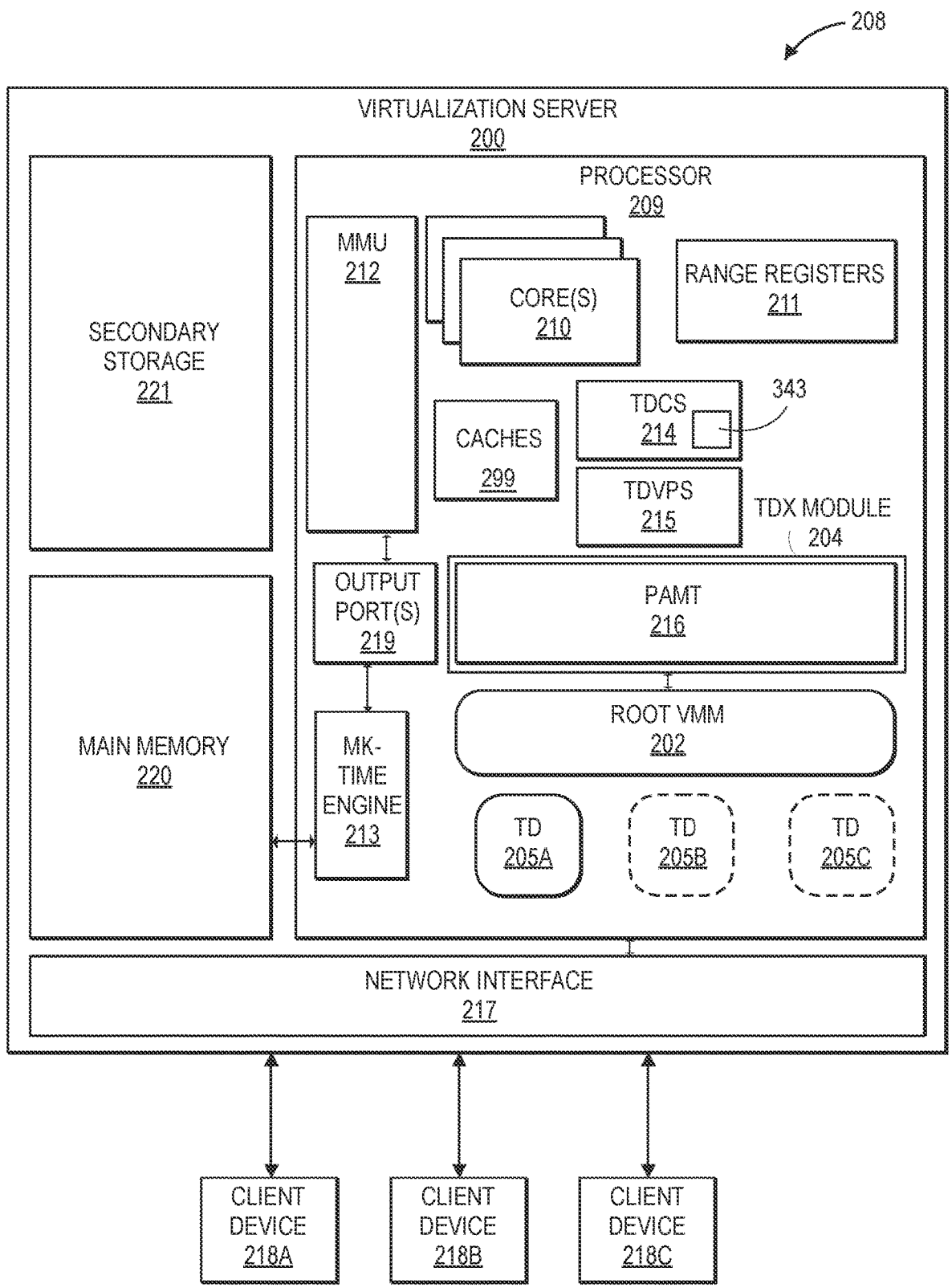
FIG. 2 is a block diagram illustrating an example computing system that provides isolation in virtualized systems using trust domains according to one implementation.

FIG. 2 is a schematic block diagram of a computing system 208 that provides isolation in virtualized systems using TDs, according to an implementation of the disclosure. The virtualization system includes a virtualization server 200 that supports a number of client devices 218A-218C. The virtualization server includes at least one processor 209 (also referred to as a processing device) that executes a VMM 202. The VMM may include a VMM (may also be referred to as hypervisor) that may instantiate one or more TDs 205A-205C accessible by the client devices 218A-218C via a network interface 217. The client devices may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD, and integrity-protecting the key against any tamper by the host software or host-controlled devices.

The processor 209 may include one or more cores 210, range registers 211, a memory management unit (MMU) 212, and output port(s) 219. FIG. 2 is a schematic block diagram of a detailed view of a processor core 210 executing a VMM 202 in communication with a PAMT 216 and secure-EPT 343 and one or more trust domain control structure(s) (TDCS(s)) 214 and trust domain virtual-processor control structure(s) (TDVPS(s)) 215, as shown in FIG. 2. TDVPS and TDVPX may be used interchangeable herein. The processor 209 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another implementation, the processor 209 may be used in a SoC system.

The computing system 208 may be a server or other computer system having one or more processors available from Intel Corporation, although the scope of the invention is not so limited. In one implementation, sample system 208 executes a version of the WINDOWS™ operating system available from Microsoft Corporation of Redmond, Washington, although other operating systems (UNIX and Linux for example), embedded software, and/or graphical user interfaces, may also be used. Thus, implementations of the disclosure are not limited to any specific combination of hardware circuitry and software.

The one or more processing cores 210 execute instructions of the system. The processing core 210 includes, but is not limited to, pre-fetch circuitry to fetch instructions, decode circuitry to decode the instructions, execution circuitry to execute instructions and the like. In an implementation, the computing system 208 includes a component, such as the processor 209 to employ execution units including circuitry to perform algorithms for processing data.

The virtualization server 200 includes a main memory 220 and a secondary storage 221 to store program binaries and OS driver events. Data in the secondary storage 221 may be stored in blocks referred to as pages, and each page may correspond to a set of physical memory addresses. The virtualization server 200 may employ virtual memory management in which applications run by the core(s) 210, such as the TDs 205A-205C, use virtual memory addresses that are mapped to guest physical memory addresses, and guest physical memory addresses are mapped to host/system physical addresses by a MMU 212.

The core 210 may use the MMU 212 to load pages from the secondary storage 221 into the main memory 220 (which includes a volatile memory and/or a non-volatile memory) for faster access by software running on the processor 209 (e.g., on the core). When one of the TDs 205A-205C attempts to access a virtual memory address that corresponds to a physical memory address of a page loaded into the main memory, the MMU returns the requested data. The core 210 may execute the VMM portion of VMM 202 to translate guest physical addresses to host physical addresses of main memory and provide parameters for a protocol that allows the core to read, walk and interpret these mappings.

In one implementation, processor 209 implements a TD architecture and ISA extensions (SEAM) for the TD architecture. The SEAM architecture and the TDX-Module running in SEAM mode provides isolation between TD workloads 205A-205C and from CSP software (e.g., VMM 202 and/or a CSP VMM (e.g., root VMM 202)) executing on the processor 209). Components of the TD architecture can include 1) memory encryption, integrity and replay-protection via an MKTME engine 213, 2) a resource management capability referred to herein as the VMM 202, and 3) execution state and memory isolation capabilities in the processor 209 provided via a PAMT 216 and secure-EPT 343 and TDX module 204 and via access-controlled confidential TD control structures (i.e., TDCS 214 and TDVPS 215). The TDX architecture provides an ability of the processor 209 to deploy TDs 205A-205C that leverage the MKTME engine 213, the PAMT 216 and Secure-EPT 343, and the access-controlled TD control structures (i.e., TDCS 214 and TDVPS 215) for secure operation of TD workloads 205A-205C.

In implementations of the disclosure, the VMM 202 acts as a host and has control of the cores 210 and other platform hardware. A VMM assigns software in a TD 205A-205C with logical processor(s). The VMM, however, cannot access a TD's execution state on the assigned logical processor(s). Similarly, a VMM assigns physical memory and I/O resources to the TDs, but is not privy to access the memory state of the TDs due to separate encryption keys, and other integrity and replay controls on memory.

With respect to the separate encryption keys, the processor may utilize the MKTME engine 213 to encrypt (and decrypt) memory used during execution. With total memory encryption (TME), any memory accesses by software executing on the core 210 can be encrypted in memory with an encryption key. MKTME is an enhancement to TME that allows use of multiple encryption keys. The processor 209 may utilize the MKTME engine to cause different pages to be encrypted using different MKTME keys. The MKTME engine 213 may be utilized in the TD architecture described herein to support one or more encryption keys per each TD 205A-205C to help achieve the cryptographic isolation between different CSP customer workloads. For example, when MKTME engine is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software.

Each TD 205A-205C is a software environment that supports a software stack consisting of VMMs (e.g., using virtual machine extensions (VMX)), OSes, and/or application software (hosted by the OS). Each TD may operate largely independently of other TDs and use logical processor(s), memory, and I/O assigned by the VMM 202 on the platform. Software executing in a TD operates with reduced privileges so that the VMM can retain control of platform resources; however, the VMM cannot affect the confidentiality or integrity of the TD under defined circumstances. Further details of the TD architecture and TDX are described in more detail below with reference to FIG. 3.

System 208 includes a main memory 220. Main memory includes a DRAM device, a static random access memory (SRAM) device, flash memory device, or other memory device. Main memory stores instructions and/or data represented by data signals that are to be executed by the processor 209. The processor may be coupled to the main memory via a processing device bus. A system logic chip, such as a memory controller hub (MCH) may be coupled to the processing device bus and main memory. An MCH can provide a high bandwidth memory path to main memory for instruction and data storage and for storage of graphics commands, data and textures. The MCH can be used to direct data signals between the processor, main memory, and other components in the system and to bridge the data signals between processing device bus, memory, and system I/O, for example. The MCH may be coupled to memory through a memory interface. In some implementations, the system logic chip can provide a graphics port for coupling to a graphics controller through an Accelerated Graphics Port (AGP) interconnect.

The computing system 208 may also include an I/O controller hub (ICH). The ICH can provide direct connections to some I/O devices via a local I/O bus. The local I/O bus is a high-speed I/O bus for connecting peripherals to the memory 220, chipset, and processor 209. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

Figure 3:
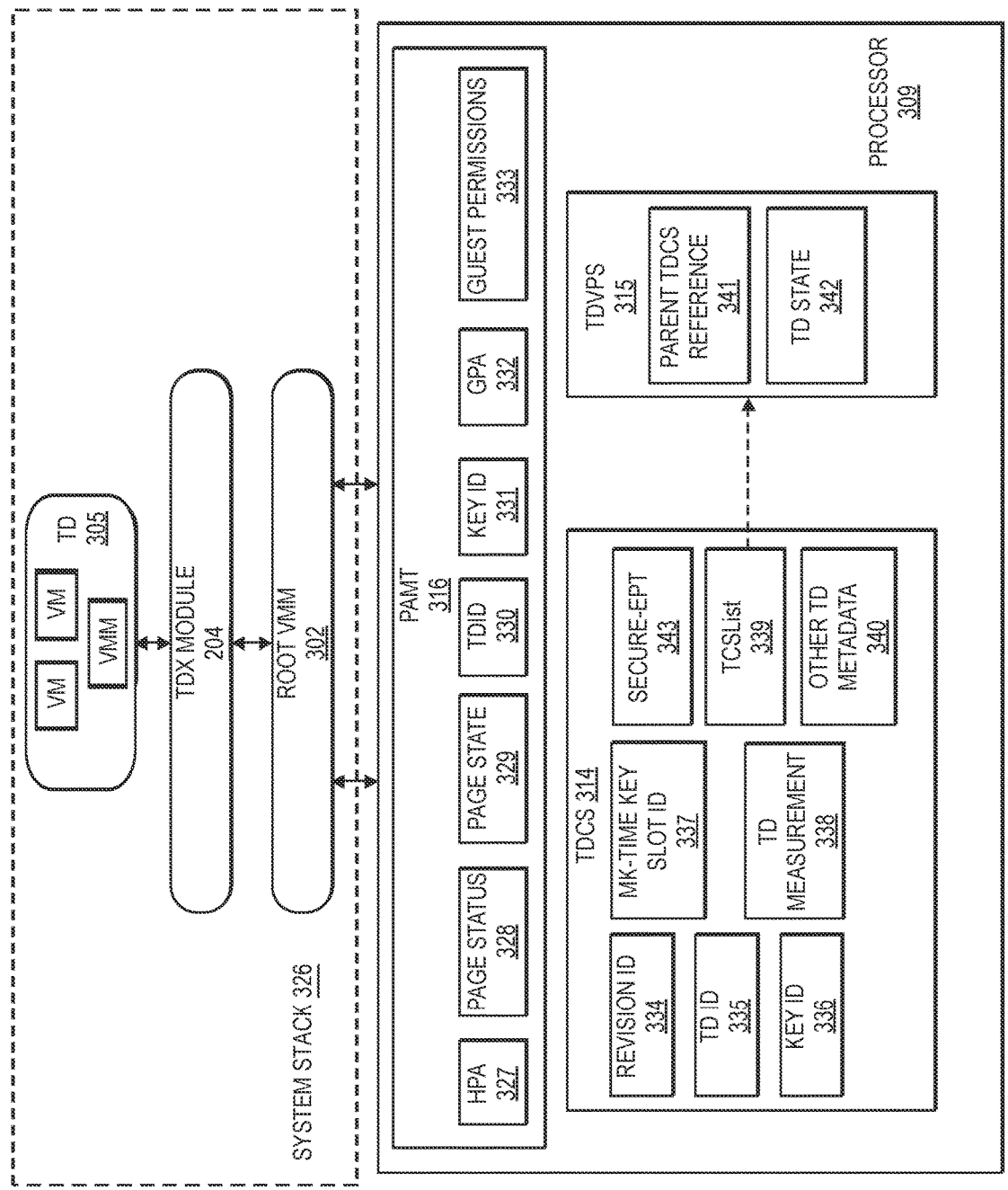
FIG. 3 is a block diagram illustrating another example computing system that provides isolation in virtualized systems using trust domains according to one implementation.

With reference to FIG. 3, this figure depicts a block diagram if a processor 309 suitable for the processor 209 of FIG. 2, according to one implementation of the disclosure. In one implementation, the processor may execute a system stack 326 via a single core 210 or across several cores 210. As discussed above, the processor may provide a TD architecture and TDX to provide confidentiality (and integrity) for customer software running in the customer/tenants (i.e., TDs 205A) in an untrusted cloud service providers (CSP) infrastructure. The TD architecture provides for: memory isolation via a PAMT 316 and Secure-EPT 343; CPU state isolation that incorporates CPU key management via TDCS 314 and/or TDVPS 315; and CPU measurement infrastructure for TD 205A software.

In one implementation, TD architecture provides ISA extensions (referred to as TDX) that support confidential operation of OS and OS-managed applications (virtualized and non-virtualized). A platform, such as one including processor 209, with TDX enabled can function as multiple encrypted contexts referred to as TDs. For ease of explanation, a single TD 305 is depicted. Each TD can run VMMs, VMs, OSes, and/or applications. For example, TD 305 is depicted as hosting a VMM and two VMs. A TDX module 204 supports the TD 305.

In one implementation, the VMM 202 may include as part of VMM functionality (e.g., root VMM). A VMM may refer to software, firmware, or hardware to create, run, and manage a virtual machines (VM). It should be noted that the VMM may create, run, and manage one or more VMs. The VMM may create and run the VM and allocate one or more virtual processors (e.g., vCPUs) to the VM. The VM may also be referred to as guest herein. The VMM may allow the VM to access hardware of the underlying computing system, such as computing system 208 of FIG. 2. The VM may execute a guest operating system (OS). The VMM may manage the execution of the guest OS. The guest OS may function to control access of virtual processors of the VM to underlying hardware and software resources of the computing system. It should be noted that, when there are numerous VMs operating on the processing device, the VMM may manage each of the guest OSes executing on the numerous guests.

TDX also provides a programming interface for a TD management layer of the TD architecture referred to as the VMM 202. A VMM may be implemented as part of the CSP/root VMM. The VMM manages the operation of TDs 205A/B/C. While a VMM 202 can assign and manage resources, such as CPU, memory and input/output (I/O) to TDs, the VMM is designed to operate outside of a TCB of the TDs. The TCB of a system refers to a set of hardware, firmware, and/or software component that have an ability to influence the trust for the overall operation of the system.

In one implementation, the TD architecture is thus a capability to protect software running in a TD 205A. As discussed above, components of the TD architecture may include 1) Memory encryption via a TME engine having multi-key extensions to TME (e.g., MKTME engine 213 of FIG. 2), 2) a software resource management layer (VMM 202), and 3) execution state and memory isolation capabilities in the TD architecture.

The PAMT 216 and Secure-EPT 343 are structures, such as a table, managed by the TDX-Module to enforce assignment of physical memory pages to executing TDs, such as TD 205A. The processor 209 also uses the PAMT and Secure-EPT to enforce that the physical addresses referenced by software operating as a tenant TD or the VMM cannot access memory not explicitly assigned to it. The PAMT and Secure-EPT enforces the following properties. First, software outside a TD should not be able to access (read/write/execute) in plain-text any memory belonging to a different TD (this includes the VMM). Second, memory pages assigned via the PAMT and Secure-EPT to specific TDs, such as TD, should be accessible from any processor in the system (where the processor is executing the TD that the memory is assigned to).

The PAMT and Secure-EPT structure is used to hold meta-data attributes for each 4 KB page of memory. Additional structures may be defined for additional page sizes (2 MB, 1 GB). The meta-data for each 4 KB page of memory is direct indexed by the physical page address. In other implementations, other page sizes may be supported by a hierarchical structure (like a page table). A 4 KB page referenced in the PAMT and Secure-EPT can belong to one running instance of a TD. 4 KB pages referenced in the PAMT and Secure-EPT can either be valid memory or marked as invalid (hence could be IO for example). In one implementation, each TD instance includes one page holding a TDCS for that TD.

In one implementation, the PAMT and Secure-EPT is aligned on a 4 KB boundary of memory and occupies a physically contiguous region of memory protected from access by software after platform initialization. In an implementation, the PAMT is a micro-architectural structure and cannot be directly accessed by software. The PAMT and Secure-EPT may store various security attributes for each 4 KB page of host physical memory.

The PAMT and Secure-EPT may be enabled when TDX is enabled in the processor (e.g., via CPUID-based enumeration). Once the PAMT and Secure-EPT is enabled, the PAMT and Secure-EPT can be used by the processor to enforce memory access control for all physical memory accesses initiated by software, including the VMM. In one implementation, the access control is enforced during the page walk for memory accesses made by software. Physical memory accesses performed by the processor to memory that is not assigned to a tenant TD or VMM fail with Abort page semantics.

Figure 4:
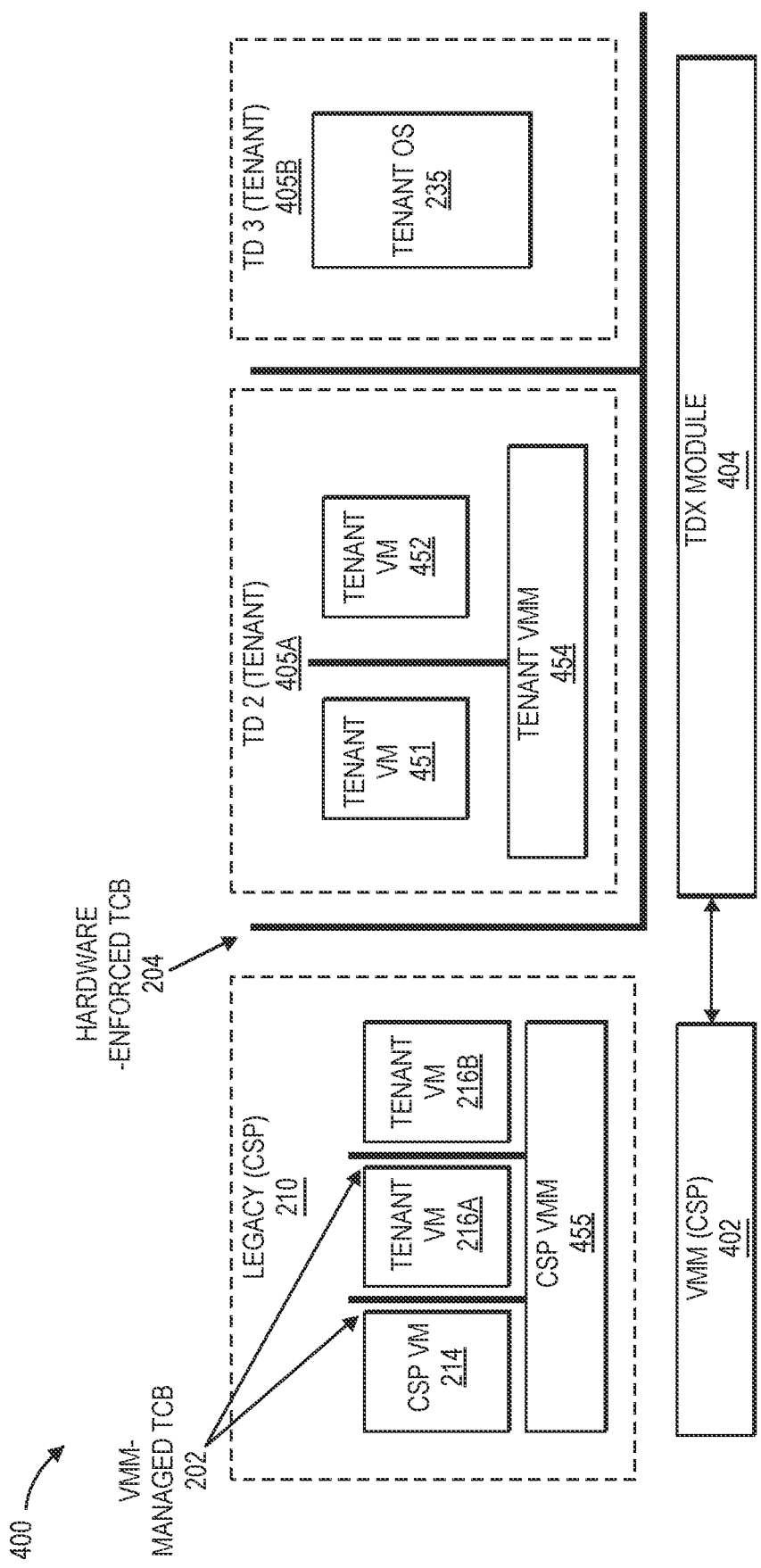
FIG. 4 is a block diagram of an example of a trust domain architecture according to one implementation.

FIG. 4 is a block diagram depicting an example computing system implementing TD architecture 400. A first environment 210 is one where the tenant trusts the CSP to enforce confidentiality and does not implement the TD architecture of implementations of the disclosure. This environment uses a CSP VMM-managed TCB 202. This environment may include a CSP VMM 455 managing a CSP VM 214 and/or one or more legacy tenant VMs 216A, 216B. In this case, the tenant VMs, are managed by the CSP VMM that is in the VM's TCB. In implementations of the disclosure, the tenant VMs, may still leverage memory encryption via TME or MKTME in this model.

The other type of environment is a TD where the tenant does not trust the CSP to enforce confidentiality and thus relies on a TDX module 404 and the CPU with TD architecture of implementations of the disclosure. This type of TD is shown in two variants as TD2 405A and TD3 405B. The TD2 405A is shown with a virtualization mode (such as VMX) being utilized by the tenant VMM (non-root) 454 running in TD2 to managed tenant VMs 451, 452. The TD3 does not include software using a virtualization mode, but instead runs an enlightened OS 235 in the TD3 405B directly. TD2 and TD3 are tenant TDs having a hardware-enforced TCB 204 as described in implementations of the disclosure. In one implementation, TD2 or TD3 may be the same as TD 205A described with respect to FIG. 2.

The VMM 402 manages the life cycle of the environment 210 as well as the TD2 405A and TD3 405B, including allocation of resources. However, the VMM 402 is not in the TCB for the TD2 and the TD3. The TD architecture 400 does not place any architectural restrictions on the number or mix of TDs active on a system. However, software and certain hardware limitations in a specific implementation may limit the number of TDs running concurrently on a system due to other constraints.

III. Migration of Trust Domains

Specific example embodiments will now be described in conjunction with migration of a TD protected by TDX. The TD is an example embodiment of a protected, hardware-isolated VM. However, those skilled in the art, and having the benefit of the present disclosure, will appreciated that the embodiments disclosed herein may also be applied to migration of other types of protected VMs, such as, for example, those protected by MKTME, SEV, SEV-SNP, SGX, or other techniques.

Figure 5:
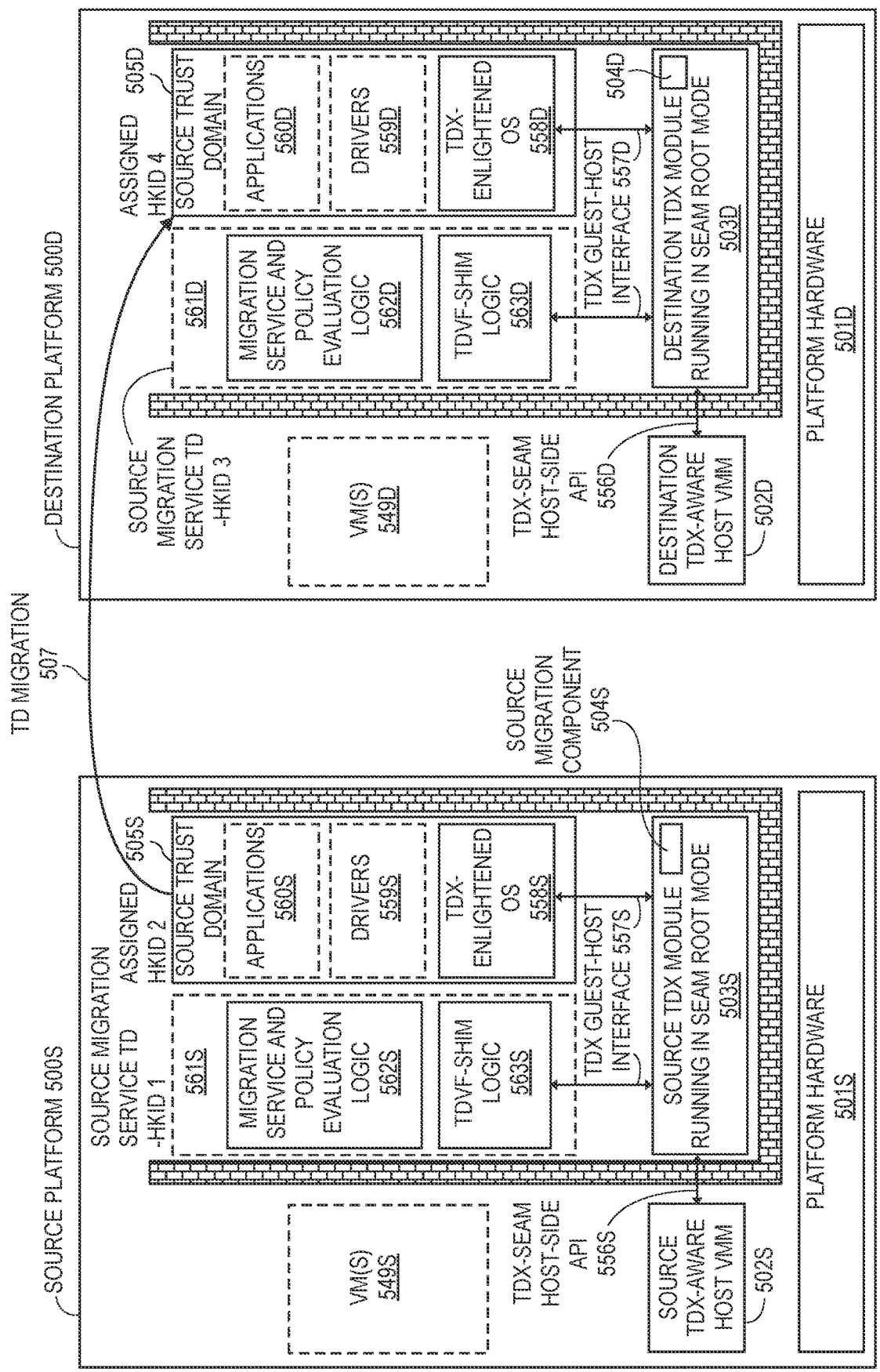
FIG. 5 is a block diagram illustrating an embodiment of migration of a source trust domain from a source platform to a destination platform.

FIG. 5 is a block diagram illustrating an embodiment of migration 507 of a source trust domain (TD) 505S from a source platform 500S to a destination platform 500D. The platforms may be of the types previously described for the platforms of FIG. 1 (e.g., servers, computer systems, etc.). The source platform has platform hardware 501S and the destination platform has platform hardware 501D. This hardware may be of the types previously described for the hardware of FIG. 1 (e.g., cores, caches, etc.).

The source platform has a source TDX-aware host VMM 502S and the destination platform has a destination TDX-aware host VMM 502D. The VMMs are sometimes referred to as hypervisors. The source and destination VMMs are TDX aware in that they are respectively able to interact with a source TDX module 503S (which is an example embodiment of the source security component 103S) and a destination TDX module 503D (which is an example embodiment of the destination security component 103D). One way in which they may be TDX-aware and interact with the TDX modules is through being operative to use respective TDX Module host-side APIs 556S, 556D to interact with the TDX modules 503S, 503D. These TDX Module host-side APIs represent example embodiments of primitives or command primitives that the VMMs may use to interact with the TDX modules. Specific examples of the APIs according to a specific example embodiment will be provided further below. Other primitives or command primitives (e.g., instructions of an instruction set, application programming interface (API) commands, writes to memory-mapped input and/or output (MMIO) registers, etc.) may be used by VMMs to interact with other security components in other embodiments.

The source TDX-aware host VMM 502S and the source TDX module 503S may manage, support, or otherwise interact with the source TD 505S. Likewise, the destination TDX-aware host VMM 502D and the destination TDX module 503D may manage, support, or otherwise interact with the destination TD 505D. The source TD may represent software operating in a CPU mode (e.g., SEAM) that excludes the TDX-aware host VMM 502S and untrusted devices of the source platform from its operational TCB for confidentiality. The source TD may have a TDX-enlightened operating system (OS) 528S and optionally one or more applications 560S and drivers 559S. Likewise, the destination TD may have a TDX-enlightened OS 558D and optionally one or more applications 560D and drivers 559D. The OS are enlightened or paravirtualized in that it is aware of it running as a TD. In other embodiments, VMMs may optionally be nested within TDs. The operational TCB for the source TD may include one or more CPUs on which the source TD runs, the source TDX module 503S, the TDX-enlightened OS, and the applications. The source TD's resources may be managed by the source TDX-aware host VMM, but its state protection may be managed by the source TDX module 503S and may not be accessible to the source TDX-aware host VMM.

Optionally, the source and destination VMMs may also manage, support, or otherwise interact respectively with one or more source VMs 549S and one or more destination VMs 549D. These VMs are not protected VMs in the same way that the TDs are protected VMs, such as by not having the same level of confidentiality (e.g., not being encrypted), not being hardware isolated to the same extent (e.g., from the VMMs), and so on.

The source platform has a source TDX module (e.g., representing an example embodiment of a source security component) and the destination platform has a destination TDX module (e.g., representing an example embodiment of a destination security component). The TDX modules may be implemented in hardware, firmware, software, or any combination thereof. The source and destination TDX module may be operative to provide protection or security to the source and destination TDs, respectively. In some embodiments, this may include protecting the TDs from software not within the trusted computing base (TCB) of the TDs, including the source and destination TDX-aware VMMs. The various types of protections described elsewhere herein may optionally be used or a subset or superset thereof. In some embodiments, this may include assigning different host key identifiers (HKIDs) to different components. When MKTME is activated, the HKID may represent a key identifier for an encryption key used by one or more memory controller on the platform. When TDX is active, the HKID space may be partitioned into a CPU-enforced space and a VMM-enforced space. In some embodiments, the source migration service TD may be assigned an HKID 1, the source TD may be assigned an HKID 2, the destination migration service TD may be assigned an HKID 3, and the destination TD may be assigned an HKID 4, where HKID 1, HKID 2, HKID 3, HKID 4 are first through fourth HKIDs that are all different. Other technologies for other protected VMS like SEV and SEV-SNP also assign different key identifiers and different keys to different protected VMs.

The source and destination TDX-aware host VMMs via the source and destination TDX modules may perform operations to respectively export or import contents of the source TD. One challenge with migrating the source TD 505S (as well as other types of protected VMs in general) is maintaining security. For example, the source TD may run in a central processing unit (CPU) mode that protects the confidentiality of its memory contents and its CPU state from any other platform software, including the source TDX-aware host VMM. Similarly, the confidentiality of its memory contents of the source TD and its CPU state should also be protected while allowing the source TDX-aware host VMM to migrate source TD to the destination platform.

The source TDX module has a source migration component 504S, and the destination TDX module has a destination migration component 504D. The source and destination TDX modules and/or their respective source and destination migration components may be operative to perform the various operations described further below to assist with the migration. The migration components may be implemented in hardware, firmware, software, or any combination thereof. The migration may move the source TD 505S from the source platform to become the destination TD 505D on the destination platform. The source and destination TDX-aware host VMMs and existing (e.g., untrusted) software stack may be largely responsible for migrating the encrypted content of the source TD once it has been encrypted and otherwise protected. The migration may either be a cold migration or a live migration as previously described. In some embodiments, the source TDX module 503S and/or the source migration component 504S may also optionally be operative to "park" the source TD 505S as previously described.

In some embodiments, an optional source migration service TD 561S and an optional destination migration service TD 561D may also be included to assist with the migration 507. The migration service TDs are example embodiments of migration agents or engines. The migration service TDs may also be referred to herein as migration TDs (MigTDs). In some embodiments, the migration service TDs may be example embodiments of service TDs per TDX that have migration logic to perform functions associated with the migration. As shown, in some embodiments, the source migration service TD may have migration service and policy evaluation logic 562S and a TD virtual firmware (TDVF)-shim logic 563S. Likewise, the destination migration service TD may have migration service and policy evaluation logic 562D and a TDVF-shim logic 563D. The logics 562S, 562D may be operative to evaluate and enforce a TD migration policy of the source TD. The TD migration policy may represent a TD tenant indicated set of rules that govern which platform security levels the TD is allowed to be migrated to, in some cases whether it may be replicated and if so how many times, or other migration policy. For example, the migration service and policy evaluation logic may be operative to cooperate to evaluate potential migration source platforms and destination platforms based on adherence to a TD migration policy of the source TD. If the TD migration policy permits a migration, then the migration service TDs may cooperate to securely transfer a migration capable key from the source platform to the destination platform which will be used to encrypt or protect contents of the source TD during the migration. In some embodiments, they may represent architecturally defined or architectural TDs. In some embodiments, they may be within the TCB of the TDs. In some embodiments, they may be more trusted by the TDs than the respective VMMs.

The TDX modules 503S, 503D and/or their migration components 504S, 504D may implement an architecturally defined TDX migration feature implemented on top of the SEAM VMX extension to protect the contents of the source TD during migration of the source TD, such as in an untrusted hosted cloud environment. Typically, the source TD may be assigned a different key ID, and in the case of TDX a different ephemeral key, on the destination platform to which the source TD is migrated. An extensible TD migration policy may be associated with the source TD that is used to maintain the source TD's security posture. The TD migration policy may be enforced in a scalable and extensible manner by the source migration service TD or migration TD (MigTD) 561S, which is used to provide services for migrating TDs. In some embodiments, pages, state, or other contents of the source TD may be protected while being transferred by SEAM and through the use of a migration capable key or migration key that is used for a unique migration session for the source TD.

The migration capable key may be used to encrypt information that is migrated to help provide confidentiality and integrity to the information. The migration service TDs on the source and the destination platforms may agree on the migration key based on migration policy information of the source TD. The migration key may be generated by the source migration service TD after a successful policy negotiation for the source TD. By way of example, the migration service TDs on each side may set the migration key in the source/destination TD using a generic binding write protocol. For example, the migration key may be programmed by the migration service TDs, via the host VMM, into the source and destination TDs' TDCS using a service TD metadata write protocol. To provide security, the migration key may optionally be accessible only by the migration service TDs and the TDX Modules. In some implementations, the key strength may be 256 bits or some other number of bits (e.g., an ephemeral AES-256-GCM key). In some embodiments, a migration stream AES-GCM protocol may be used as discussed further below which may provide that state is migrated in-order between the source and destination platform. This protocol may help to ensure or enforce the order within each migration stream. The migration key may be destroyed when a TD holding it is torn down, or when a new key is programmed.

The TDX modules 503S, 503D may respectively interact with the TDs 505S, 505D and the migration service TDs 561S, 561D through respective TDX guest-host interfaces 557S, 557D. In some embodiments, the TD migration and the source migration service TD may not depend on any interaction with the TDX-enlightened OS 558S or any other TD guest software operating inside the source TD being migrated.

As mentioned above, TDX modules (e.g., the source and destination TDX modules 503S, 503D) may implement the TDX Module host side API 556S, 556D and the TDX guest-host interfaces 557S, 557D. In some embodiments, the TDX Module host side APIs and the TDX guest-host interfaces may be accessed through instructions of an instruction set. The instructions of the instruction set represent one suitable example embodiment of command primitives that may be used to access operations provided by the TDX modules. Alternate embodiments may use other types of command primitives (e.g., commands, codes written to MMIO registers, messages provided on an interface, etc.).

In some embodiments, the TDX modules may be operative to execute or perform two types of instructions, namely a SEAMCALL instruction and a TDCALL instruction. The SEAMCALL instruction may be used by the host VMM to invoke one of multiple operations of the TDX Module host side API. The TDCALL instruction may be used by guest TD software (e.g., a TD enlightened OS) in TDX non-root mode to invoke one of multiple operations of the TDX guest-host interface. Multiple operations may be supported by both the SEAMCALL and TDCALL instructions. Each particular instance of these instructions may indicate a particular one of these operations to be performed. In the case of the TDX SEAMCALL and TDCALL instructions, the particular operation may be indicated by a leaf operation value in the general-purpose x86 register RAX, which is implicitly indicated by the instructions. The leaf value broadly represents a value that selects a particular one of the operations. Each of the operations may be assigned in any desired way a unique value and the leaf operation may be given that value to select the operation. Alternate embodiments may indicate the particular operation in different ways, such as, for example, a value in another register specified or indicated by an instruction of an instruction set, a value of an immediate of an instruction of an instruction set, an opcode or other value written to a MMIO register, and so forth.

So, the TDX-aware host VMM may invoke or otherwise use the SEAMCALL instruction to start execution of the TDX module on the hardware thread where SEAMCALL was invoked, or the TD may invoke or otherwise use the TDCALL instruction causing the TDX module to execute on the physical logical processor and/or hardware thread where the TD virtual logical processor was executing. The TDX module may receive the instructions. The TDX module may be operative to determine the particular operations to be performed as indicated by the leaf operations or other value. Some variants of the instructions may have one or more other input parameters or operands to be used in the performance of the operations but others may not. These input parameters or operands may be in memory, registers, or other storage locations specified (e.g., explicitly specified) or otherwise indicated (e.g., implicitly indicated) by the instructions. The TDX module may include logic to understand and perform the instructions. In some embodiments, this may include a decode unit or other logic to decode the instruction and an execution unit or other logic to execute or perform the instruction and/or its indicated operations. In one example embodiment, the SEAMCALL instruction and leaf may be decoded and executed by a CPU like other instructions of an instruction set of the CPU, and its execution may transfer control to the TDX module. In such an example embodiment, the TDX module may include software that is loaded into and operates from a range-register protected memory region such that its authenticity can be verified via a CPU-signed measurement or quote, and can be protected from tampering by other software and hardware at runtime (e.g., since the region of memory may be encrypted and integrity protected using a private ephemeral key which is different from the TD keys). The TDX module may include a dispatcher submodule that may invoke an appropriate operation (e.g., an API) indicated by the leaf function. The indicated operation may then be performed also by the CPU (e.g., one or more cores). This is just one possible way it may be done. In other embodiments, the SEAMCALL or other primitives may be performed in hardware, software, firmware or any combination thereof (e.g., at least some hardware and/or firmware potentially combined with software).

The TDX modules may perform the instruction and/or operations. In some embodiments, the TDX modules may perform one or more checks. In some cases the checks may fail or an error may occur before the instruction and/or operations completes. In other cases, the checks may succeed and the instruction and/or operations may complete without an error. In some embodiments, an optional return or status code (e.g., a value) may be stored to indicate an outcome of the performance of the instruction and/or operations (e.g., whether the instruction and/or operations completed successfully or whether there was an error, such as that the TDX Module experienced a fatal condition and has been shutdown). In the case of the TDX SEAMCALL and TDCALL instructions, the return or status code may be provided in the implicit general-purpose x86 register RAX. Alternate embodiments may indicate the return or status code in other ways (e.g., in one or more flags, registers, memory locations, or other architecturally-visible storage locations). Some instructions and/or operations may have additional output parameters or operands that may be stored in architecturally-visible storage locations while others may not.

Table 1 lists an example set of operations of a TDX Module host side API according to one example embodiment. The set of operations may be supported by a TDX module (e.g., the source TDX module 503S and the destination TDX module 503D). It is to be appreciate that this is just one example set of operations and that the scope of the invention is not limited to this particular example set of operations. Many other embodiments are contemplated in which two or more of the operations may be combined together into a single operation and/or one of the operations may be divided into two or more operations and/or various of the operations may be performed differently. In some embodiments, each of these operations may be available as a different leaf operation under a SEAMCALL instruction with the SEAMCALL instruction serving as the opcode and the leaf operation as a value indicated by the SEAMCALL instruction. The table is arranged in rows and columns. Each row represents a different operation under the SEAMCALL instruction. A mnemonics column lists a unique mnemonic for each of the operations. The mnemonics are in text to uniquely identify the different instruction variants to a human reader, although it is to be understood that the there may also be numerical (e.g., binary) value for each of these different operations. Particular numerical values are not provided because they may be assigned arbitrarily or at least in various different ways. An operation column lists the particular operation to be performed. The specific operations can be read from the table for each of the mnemonics. It is to be appreciated that these operations may be performed differently in different embodiments. A method according to embodiments may include performing any one or more of these operations as part of performing an instruction (e.g., a SEAMCALL instruction) or other command primitive.

TABLE 1

TDX Module host side API operations

| Opcode and Mnemonic | Operation |
|---|---|
| TDH.EXPORT.STATE.IMMUTABLE | Used by host VMM to capture source TD immutable configuration and meta-data for migration. Provides Migration key MAC'ed TD_INIT_CONFIG which is used to initialize the destination TD. |
| TDH.IMPORT.STATE.IMMUTABLE | Used by host VMM to provide destination Intel TDX Module the immutable configuration for destination TD. Operand is Migration key MAC'ed TD_INIT_CONFIG to provide params to initialize the destination TD. |
| TDH.EXPORT.BLOCKW | Used by host VMM to block a private page mapping from creating mappings with Write permissions for TD. TLB flushing is enforced via TLB tracking. |
| TDH.EXPORT.UNBLOCKW | Used by host VMM to un-block a private page mapping from creating mappings with Write permissions for TD |
| TDH.EXPORT.PAGE | Used by host VMM to capture source TD in-use memory page contents and Page meta-data (GPA, attributes etc.) into a separate host physical address provided by the VMM - used in pre-copy stage to preserve the original contents to enable aborting the migration. |
| TDH.EXPORT.PAGE.INPLACE | Used by host VMM to capture source TD in-use memory page contents and Page meta-data (GPA, attributes etc.) into the same page as the host had assigned to the TD - this API is used only in post-copy stage. |
| TDH.EXPORT.CANCEL | Used by host VMM to cancel an export operation on a TD private page |
| TDH.IMPORT.PAGE | Used by host VMM to initialize destination TD memory pages from MAC'ed page contents from source TD and page meta-data (GPA, attributes etc.) for installed S-EPT mappings. Import is always performed in-place. |
| TDH.EXPORT.STATE.VP | Used by host VMM to capture source TD VCPU state and meta-data after source TD execution is paused. |

TABLE 1-continued

TDX Module host side API operations

| Opcode and Mnemonic | Operation |
|---|---|
| TDH.IMPORT.STATE.VP | Used by host VMM to initialize destination TD VCPU state from MAC'ed page contents from source TD. |
| TDH.EXPORT.STATE.TD | Used by host VMM to capture source TD global state and metadata after source TD execution is paused. |
| TDH.IMPORT.STATE.TD | Used by host VMM to initialize destination TD global state (e.g. RTMRs) from TDCS MAC'ed page contents from source TD. |
| TDH.EXPORT.COMMIT | TDH.EXPORT.COMMIT starts the post copy export committed period on the source platform, where the source TD is guaranteed not to run anymore. |
| TDH.EXPORT.PAUSE | Used by host VMM to transition the source TD to a paused state (after Intel TDX module verifies that all TD vCPU are not active) to capture the final VCPU state before the destination TD can be un-paused via TDH.IMPORT.STATE.DONE |
| TDH.EXPORT.STATE.DONE | Used by host VMM to create a start-token from a source SEAM to authorize the destination SEAM to allow the migrated TD to become runnable |
| TDH.IMPORT.STATE.DONE | Used by host VMM to use a start-token from a source SEAM to authorize the destination SEAM to allow the migrated TD to become runnable. |
| TDH.EXPORT.ABORT | Used by a host VMM to use an abort-token to allow the source (paused) TD to become runnable. |
| TDH.IMPORT.ABORT | Used by a host VMM to abort the import to a destination TD and generate an abort token. |
| TDH.SERVTD.BIND | Specified as a generic interface to bind a service TD to a client TD. |

The TDX module supporting each of these operations may have a corresponding set of logic to perform each of these operations. Such logic may include hardware (e.g., circuitry, transistors, etc.), firmware (e.g., microcode or other low-level or circuit-level instructions stored in non-volatile memory), software, or any combination thereof (e.g., at least some hardware and/or firmware potentially combined with some software). For convenience, in the discussion below, such logic of the TDX module for each operation is also referred to by the mnemonic for that corresponding operation. While described as being separate logic for convenience and to simplify the description, it is also to be appreciated that logic of some operations may be shared by and reused by other operations. That is, the logic need not be separate but rather may optionally overlap in order to reduce the total amount of logic that needs to be included in the TDX module.

Figure 6A:
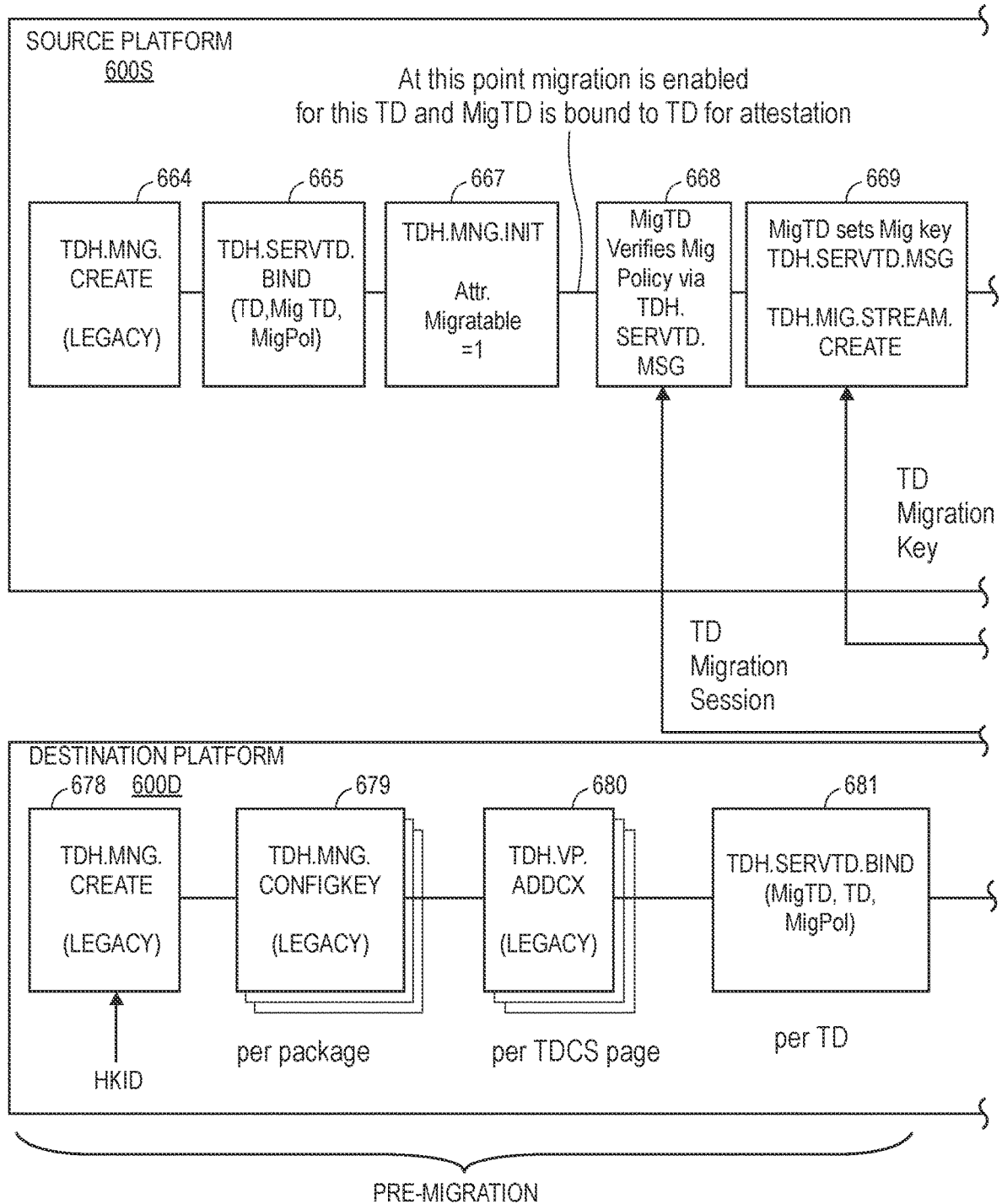
FIGS. 6A-C is a block diagram illustrating a detailed example of logic involved in migration of a source trust domain from a source platform to a destination platform.
Figure 6B:
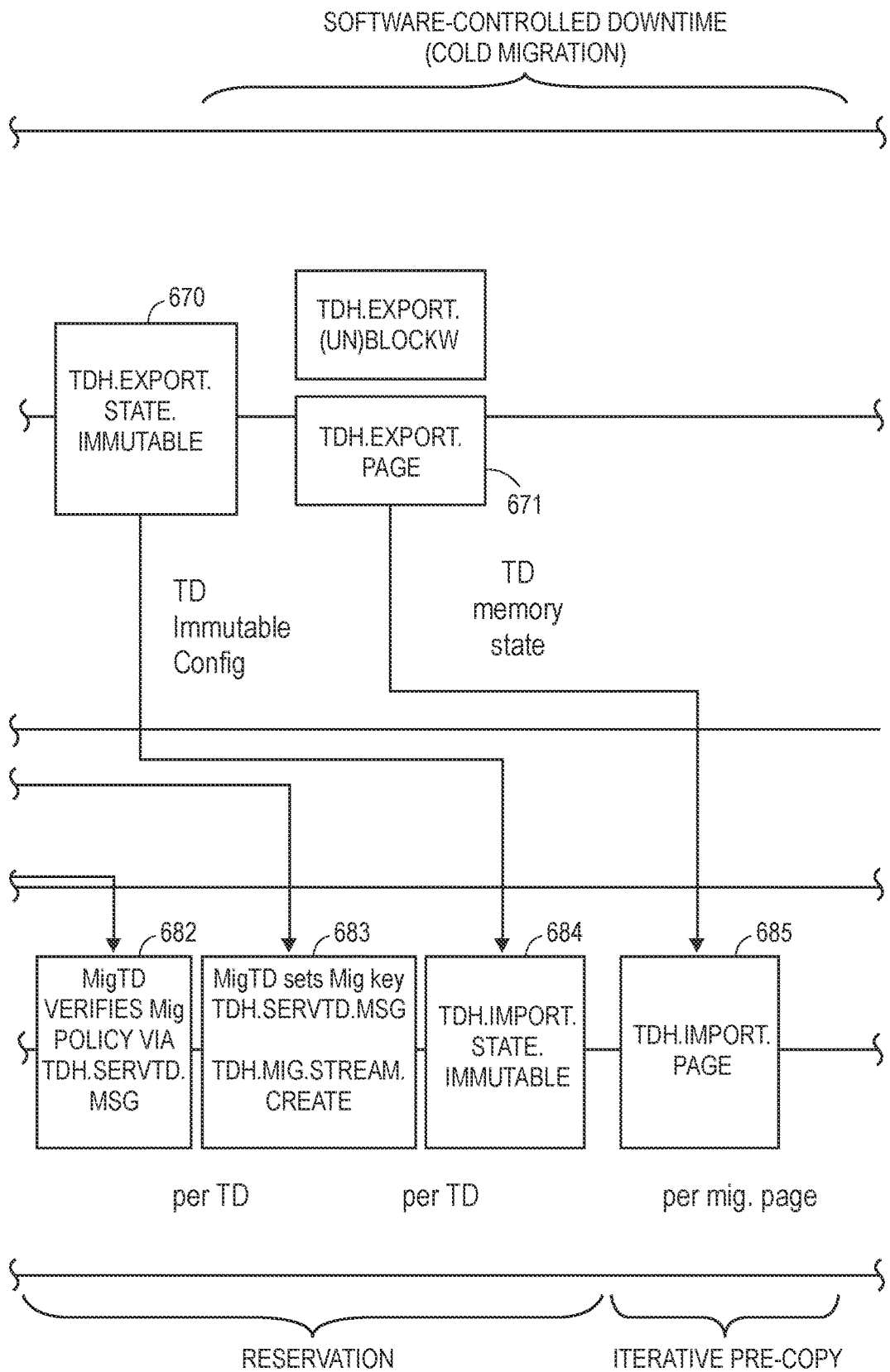
Figure 6C:
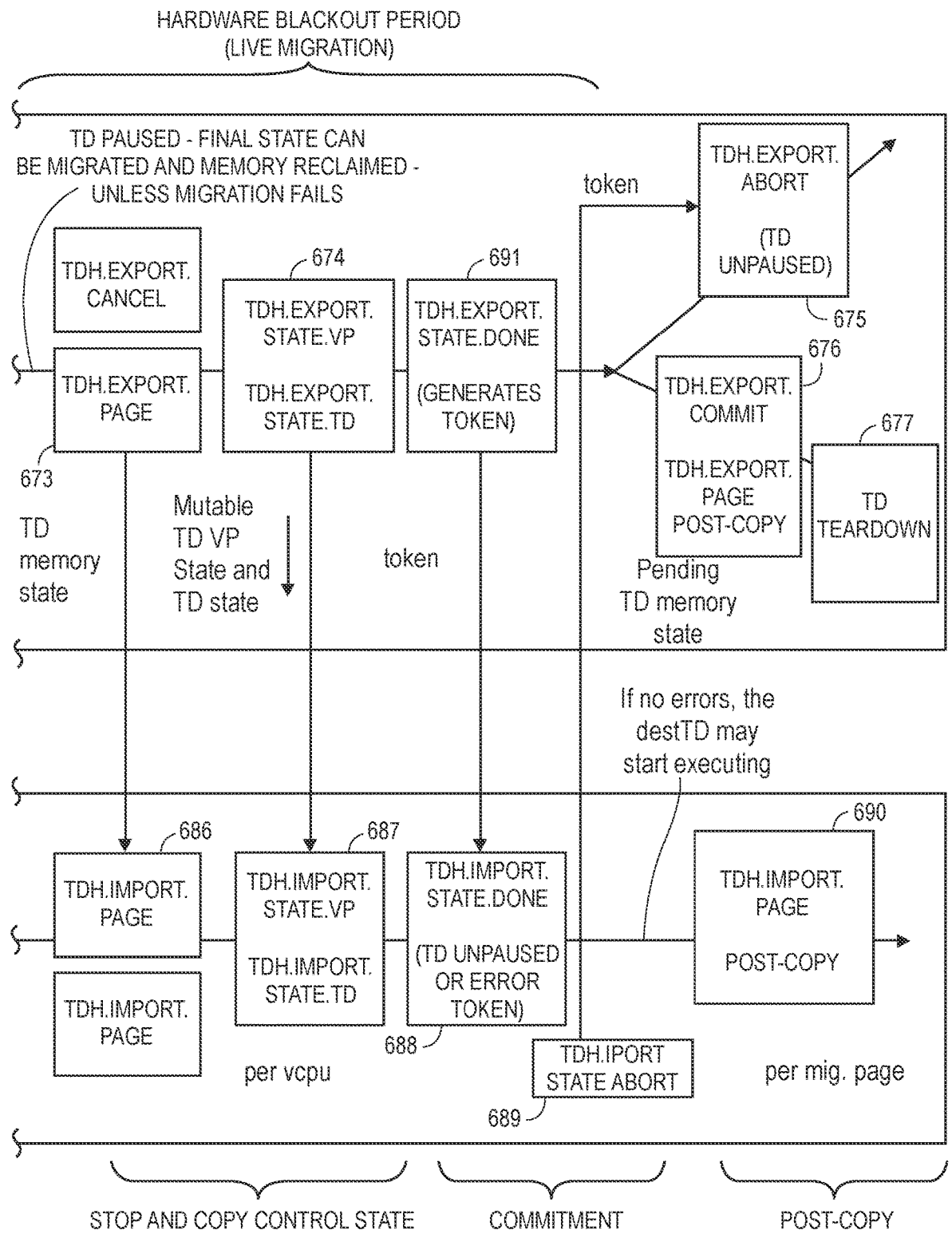

FIGS. 6A-C are a block diagram illustrating a detailed example of logic involved in migration of a TD from a source platform 600S to a destination platform 600D. Each block may represent logic to perform a corresponding operation at a stage of the migration. Most of the blocks are named the same or analogously to the mnemonics of Table 1, and each such block may represent logic of the TDX module (e.g., TDX module 503S if the logic is in the source platform 500S or TDX module 503D if the logic is in the destination platform 500D) that is operative to perform the corresponding operation of that mnemonic. Several of the logic with MigTD in their names are logic of the MigTD (e.g., MigTD 561S if the logic is in the source platform or MigTD 561D if the logic is in the destination platform). Each such logic may be implemented in hardware, firmware, software, or any combination (e.g., at least some hardware and/or firmware potentially combined with software).

The logic and be used and their operations may be performed generally at the stage of the migration at which the logic block is shown. The migration proceeds generally from left to right in time. As shown on the bottom of the illustration, the stages include with increasing time initially a pre-migration stage, a reservation stage, an iterative pre-copy stage, a stop and copy control state stage, a commitment stage, and finally a post-copy stage.

Initially, as shown on the top left of the illustration, a source guest TD may be built. As a legacy TD, the source VMM may call a legacy TDH.MNG.CREATE logic 664 to perform its associated TDH.MNG.CREATE TDX operation to create a source TD. A destination guest TD may be built similarly. The destination VMM may call a legacy TDH.MNG.CREATE logic 678 to perform its associated TDH.MNG.CREATE operation to create a destination TD. The destination TD may be setup as a "template" to receive the state of the source TD.

The source VMM may call a TDH.SERVTD.BIND logic 665 to perform its associated TDH.SERVTD.BIND operation to bind a MigTD to the source TD being migrated and optionally others source TDs. Similarly, a migration TD is bound to the destination TD as well. The source VMM can then build the TDCS by adding TDCS pages using another TDX module operation. The destination VMM may call a TDH.MNG.CONFIGKEY logic 679 to perform its associated TDH.MNG.CONFIGKEY operation to program the HKID and hardware-generated encryption key assigned to the TD into the MKTME encryption engines for each package.

The source VMM may call a TDH.MNG.INIT logic 667 to perform its associated TDH.MNG.INIT operation to set immutable control state. This immutable control state may represent TD state variables that may be modified during TD build but are typically not modified after the TD's measurement is finalized. Some of these state variables control how the TD and its memory is migrated. Therefore, as shown, the immutable TD control state or configuration may be migrated before any of the TD memory state is migrated. Since the source TD is to be migrated, it may be initialized with a migration capable attribute. The source VMM may also call the TDX module to learn that the TDX module supports TD Migration. The TDX module may responsively return information about its migration capabilities (e.g., whether live migration is supported).

The destination VMM may call a TDH.SERVTD.BIND logic 681 to perform its associated TDH.SERVTD.BIND operation of attestation and binding of the destination MigTD. The source MigTD logic 669 and the destination MigTD logics 682 may perform their TDHSERVTD.MSG operations to perform a quote-based mutual authentication (e.g., using Diffie-Hellman exchange) of the migration TDs executing on both the source and destination platforms, verify or process TD migration policy (e.g., establish TD migration compatibility per a migration policy of the source TD), establish a secure or protected transport session or channel between the TDX modules and MigTDs, perform migration session key negotiation, generate an ephemeral migration session key, and populate a TDCS with the migration key. Control structure resources may also be reserved for the TD template to start migration.

The source MigTD logic 668 and the destination MigTD logics 682 may perform their TDH.SERVTD.MSG and TDH.MIG.STREAM.CREATE operations to transfer the migration key from the source platform to the destination platform and write the migration session key to the target TD's TDCS. Service TD binding allows the Migration TD to access specific target TD metadata, by exchanging messages encrypted and MAC'ed with an ephemeral binding key.

TD global immutable control state may also be migrated. The TDX module may protect the confidentiality and integrity of a guest TD global state (e.g., TD-scope control structures), which may store guest TD metadata, and which are not directly accessible to any software or devices besides the TDX module. These structures may be encrypted and integrity-protected with a private key and managed by the TDX module API functions. Some of these immutable control state variables control how the TD and its memory is migrated. Therefore, the immutable TD control state may be migrated before any of the TD memory state is migrated. The source VMM may call a TDH.EXPORT.STATE.IMMUTABLE logic 670 to perform its associated TDH.EXPORT.STATE.IMMUTABLE operation to export the immutable state (e.g., TD immutable configuration information). The destination VMM may call a TDH.IMPORT.STATE.IMMUTABLE logic 684 to perform its associated TDH.IMPORT.STATE.IMMUTABLE operation to import the immutable state.

TD private memory migration can happen in the in-order migration phase and out-of-order migration phase. During the in-order phase, the source VMM may call a TDH.EXPORT.PAGE logic 671 to perform its associated TDH.EXPORT.PAGE operation to export memory content (e.g., one or more pages). In live migration, this may be done during live migration pre-copy stage while the source TD is running. The destination VMM may call a TDH.IMPORT.PAGE logic 685 to perform its associated TDH.IMPORT.PAGE operation to import memory content (e.g., one or more pages). Live migration is not required. Cold migration may be used instead where the source TD is paused prior to exporting memory content. Also, shared memory assigned to the TD may be migrated using legacy mechanisms used by the VMM (since shared memory is accessible to the VMM freely).

TD migration may not migrate the HKIDs. Rather, a free HKID may be assigned to the TD created on the destination platform to receive migratable assets of the TD from the source platform. All TD private memory may be protected during transport from the source platform to the destination platform using an intermediate encryption performed using AES-GCM 256 using the TD migration key negotiated via the migration TD and SEAM. On the destination platform the memory may be encrypted via the destination ephemeral key as it is imported into the destination platform memory assigned to the destination TD.

In live migration, the destination TD may begin execution during the migration process. In a typical live migration scenario where the source TD is expected to be migrated (without cloning), the destination TD may begin executing after the iterative pre-copy stage imports the working set of memory pages. The source VMM may call a TDH.EXPORT.PAUSE logic 672 to perform its associated TDH.EXPORT.PAUSE operation to pause the source TD. This may include checking pre-conditions and preventing the source TD from executing any more. After the source TD has been paused, a hardware blackout period may be entered where remaining memory, final (mutable) control state of the source TD, and global control state may be exported from the source platform and imported by the destination platform.

The source VMM may call a TDH.EXPORT.PAGE logic 673 to perform its associated TDH.EXPORT.PAGE operation to export memory state. The destination VMM may call a TDH.IMPORT.PAGE logic 686 to perform its associated TDH.IMPORT.PAGE operation to import memory state. TD mutable non-memory state is a set of source TD state variables that might have changed since it was finalized. Immutable non-memory state exists for the TD scope (as part of the TDR and TDCS control structures) and the VCPU scope (as part of the TDVPS control structure). The source VMM may call a TDH.EXPORT.STATE.VP logic 674 to perform its associated TDH.EXPORT.STATE.VP operation to export mutable TD VP state (per VCPU). The destination VMM may call a TDH.IMPORT.STATE.VP logic 687 to perform its associated TDH.IMPORT.STATE.VP operation to import mutable TD VP state. The source VMM may call a TDH.EXPORT.STATE.TD logic 674 to perform its associated TDH.EXPORT.STATE.TD operation to export TD state (per TD). The destination VMM may call a TDH.IMPORT.STATE.TD logic 687 to perform its associated TDH.IMPORT.STATE.TD operation to import TD state.

In some embodiments, post-copy of memory state may be used by allowing the TD to run on the destination platform. In some live migration scenarios, the host VMM may stage some memory state transfer to occur lazily after the destination TD has started execution. In this case, the host VMM will be required to fetch the required pages as accesses occur by the destination TD—this order of access is indeterminate and will likely differ from the order in which the host VMM has queued memory state to be transferred. The remaining memory state transferred in the post-copy stage via TDH.EXPORT.PAGE logic 676 and TDH.IMPORT.PAGE logic 690.

In order to support that on-demand model, the order of memory migration during post-copy is not enforced by TDX. In some embodiments, the host VMM may implement multiple migration queues with multiple priorities for memory state transfer. For example, the host VMM on the source platform may keep a copy of each encrypted migrated page until it receives a confirmation from the destination that the page has been successfully imported. If needed, that copy can be re-sent on a high priority queue. Another option is, instead of holding a copy of exported pages, to call TDH.EXPORT.PAGE again on demand. Also, to simplify host VMM software for this model, the TDX module interface API used for memory import in this post-copy stage will return additional informational error codes to indicate that a stale import was attempted by the host-VMM to account for the case where the low-latency import operation for a guest physical address (GPA) superseded the import from the higher latency import queue. Alternatively, in other embodiments, the VMM may first complete all memory migration before allowing the destination TD to run, yet benefit from the simpler and potentially higher performance operation supported during the out-of-order phase.

In some embodiments, the TDX modules may use a commitment protocol to enforce that all exported state for the source TD must be imported before the destination TD may run. The commitment protocol may help to ensure that a host VMM cannot violate the security objectives of TD Live migration. For example, in some embodiments, it may be enforced that both the destination and source TDs may not continue to execute after live migration of the source TD to a destination TD, even if an error causes the TD migration to be aborted.

On the source platform, TDH.EXPORT.PAUSE logic 672 starts the blackout phase of TD live migration and TDH.EXPORT.STATE.DONE logic 691 ends the blackout phase of live migration (and marks the end of the transfer of TD memory pre-copy, mutable TD VP and mutable TD global control state). TDH.EXPORT.STATE.DONE logic 691 generates a cryptographically-authenticated start token to allow the destination TD to become runnable. On the destination platform, TDH.IMPORT.STATE.DONE logic 688 consumes the cryptographic start token to allow the destination TD to be un-paused.

In error scenarios, the migration process may be aborted proactively by the host on the source platform via TDH.EXPORT.ABORT logic 675 before a start token was generated. If a start token was already generated (e.g., pre-copy completed), the destination platform may generate an abort token using TDH.IMPORT.STATE.ABORT logic 689 which generates an abort token which may be consumed by TDH.EXPORT.ABORT logic 675 by the source TD platform TDX module to abort the migration process and allow the source TD to become runnable again. Upon a successful commit, the source TD may be torn down and the migration key may be destroyed by TD teardown logic 677.

In some embodiments, the TDX modules may optionally enforce a number of security objectives. One security objective is that is that the CSP not be able to migrate a TD to a destination platform with a TCB that does not meets the minimum requirements expressed in the TD migration policy which may be configurable and attestable. As a corollary, TD attestation may enforce the base line of security. A TD may start on a stronger TCB platform and then migrated to a weaker TCB, if they are within the security policy of the TD. Another security objective is that CSP not be able to create a TD to be migratable without the tenant knowledge (the attestation report may include a TD migratable attribute). Another security objective is that CSP not be able to clone a TD during migration (only source or destination TD be executing after migration process completes). Another security objective is that CSP not be able to operate the destination TD on any stale state from the source TD. Another security objective is that security (confidentiality, integrity and replay protection) of TD migration data should be agnostic of the transport mechanism between source and destination. Another security objective is that TD migration should enforce non-migratable assets (anything that can be serialized and recreated on the target) are reset at source to allow for secure reuse and restored on destination after migration.

In some embodiments, the TDX modules may optionally enforce a number of functionality objectives. One functionality objective is that the CSP be able to migrate the tenant TD without tenant TD runtime involvement. Another functionality objective is that a TD be able to opt-in to migration at creation. Tenant software should not be part of this decision. Another functionality objective is that the CSP be able to minimize additional performance impact due to TD migration only during migrating the TD. For example, TD migration entails page fragmentation. Another functionality objective is that TD OS does not need new enlightenments to migrate TDs with TDX IO direct assigned devices. As a corollary, the TDX IO may allow for hot-plug device attach/detach notifications. Another functionality objective is that a TD be migratable with VMX nesting.

IV. Multiple Streams and Counters to Order Import

Figure 7:
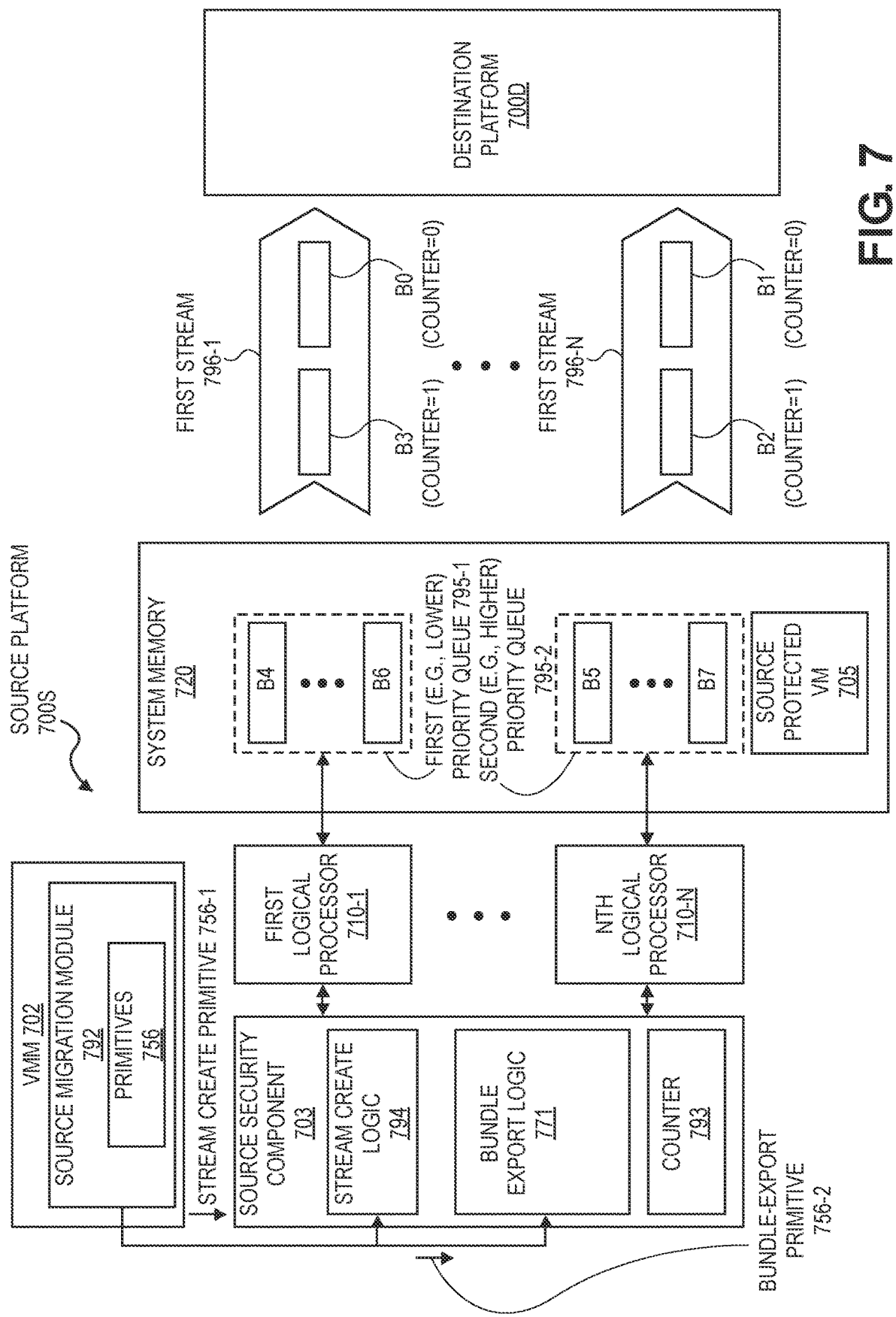
FIG. 7 is a block diagram showing migration of a source protected virtual machine from a source platform to a destination platform using multiple streams, according to some embodiments.

FIG. 7 is a block diagram showing migration of a source protected VM 705 from a source platform 700S to a destination platform 700D using multiple streams 796-1, 796-N, according to some embodiments. The source and destination platforms may each be servers or other computer systems and may be similar to or the same as others described herein (e.g., those of FIG. 1, FIG. 2, FIG. 5, etc.). The source platform includes a source security component (e.g., a TDX module, a platform security processor, etc.), which may optionally be similar to or the same as others described herein (e.g., the source security component of FIG. 1, the TDX module of FIG. 5, etc.). The source security component may be operative to support and secure a source protected VM 705. The source protected VM (e.g., a TDX trust domain, a SEV encrypted VM, an SEV-SNP encrypted virtual machine), which may optionally be similar to or the same as others described herein (e.g., source protected VM 105S of FIG. 1, source trust domain 505S of FIG. 5, etc.). The source platform also has a VMM, which may optionally be similar to or the same as others described herein (e.g., the source VMM 102S of FIG. 1, the TDX-aware host VMM 556S of FIG. 5, etc.).

The source protected VM 705 is migrated from the source platform 700S to the destination platform 700D in multiple streams 796-1, 796-N. In the illustrated embodiment, two streams are shown, namely a first stream 796-1 and an Nth stream 796-N, although there may optionally be more (e.g., up to a maximum number configured). In various embodiments, there may be two, three, four, five, at least ten, or optionally more. The VMM 702 may create or set up the streams. For example, the VMM may have a secure migration module 792 that has command primitives 756 to assist with the migration. In a TDX example, the command primitives may include SEAMCALL instructions and leaf operations mentioned elsewhere herein. The command primitives may include a stream create primitive 756-1 to configure a stream for use and the source security component may have stream create logic 794 to perform the command primitive to assist with creating a corresponding stream. By way of example, in TDX there may be a SEAMCALL TDH.MIG.STREAM.CREATE leaf to enable the VMM to initialize a migration stream context that may be used to export TD state using multiple host CPU resources and a TDX module may have logic to perform the instruction leaf in a way that enforces security objectives. Optionally, the same or analogous primitive may be used by a VMM on the destination platform to configure a stream for import of the state.

The migration streams 796-1, 796-N may be used to transfer pages concurrently. In the illustrated embodiment, the pages are transferred as bundles (e.g., B0, B1, B2, B3) that each include one or more pages and metadata (e.g., a bundle counter value as discussed further below, optional message authentication code for integrity protection, and other metadata). In some embodiments, each bundle may include a single page. In other embodiments, each bundle may include multiple pages. The pages may optionally be 4 kilobyte pages or have other sizes (e.g., larger sizes) if desired. Different bundles may be allocated (e.g., by the VMM) to different ones of the streams. For example, the command primitives 756 may include a bundle export primitive 756-2 to cause a bundle to be exported, and the source security component may have bundle export logic 771 to perform the bundle export primitive to assist with export of the bundle securely. By way of example, in TDX there may be a SEAMCALL TDH.EXPORT.PAGE leaf the VMM may use to cause TDH.EXPORT.PAGE logic to export a bundle, and a TDX module may have logic to perform the instruction leaf to cause the bundle to be exported in a way that enforces security objectives.

One possible advantage to the use of a plurality of migration streams is that it may help to increase the bandwidth or speed of the migration. Also, it may allow the migration streams to be processed concurrently using multiple logical processors. As shown, the source platform may include multiple logical processors, including a first logical processor 710-1, and an Nth logical processor 710-N. These logical processors may represent cores, hardware threads of multithreaded cores, etc.). Many computer systems and especially servers may have many logical processors (e.g., more than ten, more than twenty, more than one hundred, or even more). In the illustration, the first stream 796-1 has been configured to be processed by the first logical processor 710-1, whereas the Nth stream has been configured to be processed by the Nth logical processor 710-N. In some embodiments, at least most of the streams may optionally be configured to be processed by a different one of the logical processors to help improve the concurrency or parallelism of processing the streams and thereby increase the migration bandwidth or speed. In some embodiments, such as in TDX, the logical processors used to process the streams may be general-purpose logical processors and/or CPU cores and/or CPU hardware threads, as opposed to dedicated special purpose security processors. As previously mentioned, many modern computer systems, and especially servers, have many CPU logical processors, whereas typically they have fewer or only one dedicated special purpose security processors. By having the processing be performed by the CPU logical processors makes many more logical processors available for the processing which may help to increase concurrency or parallelism of processing the streams and thereby increase the migration bandwidth or speed.

One or more migration queues may be used for the migration. In some embodiments, two or more migration queues may optionally be used. As shown, a system memory 720 may optionally include a first queue 795-1 and a second queue 795-2. In this illustration, the first queue is used for the first stream and the second queue is used for the Nth stream, although that is not required. It is also possible for multiple streams to use the same queue and for a stream to use multiple queues.

One possible reason to have multiple queues, according to embodiments, is for prioritization of the speed of transfer of certain bundles over other bundles (e.g., prioritization of bundles B5 and B7 over B4 and B6). By way of example, the second queue 795-2 may be assigned (e.g., by the VMM) a higher priority for temporal delivery than the first queue 795-1 (e.g., the first queue may be a lower temporal priority queue and the second queue may be a higher temporal priority queue where these terms lower and higher are relative terms referring only to each other not absolute terms referring to any specific level). One possible reason for such prioritization is to support quality of service (QoS) objectives, although there are other reasons. Certain types of data may be regarded as temporally higher-priority data (e.g., that needs to be migrated relatively faster), whereas other types of data may be regarded as temporally lower-priority data (e.g., that can be migrated relatively more slowly). As one specific example, post-copy of pages on demand (e.g., such as may be triggered by an extended paging table violation on the destination platform) may have a relatively higher priority than other post-copy of pages that can be more lazily migrated. To avoid head-of-line blocking in which the higher-priority pages are forced to wait in the same queue as lower priority pages, the second higher priority queue may optionally be used and the higher-priority pages may be selectively allocated to the second higher priority queue by the host VMM. The VMM may decide according to various criteria whether to put pages to be migrated in the relatively higher-priority queue or in the relatively lower-priority queue (e.g., as one example may put post-copy pages on demand in the relatively higher-priority queue and put other post-copy pages in the relatively lower-priority queue). This may also optionally allow different streams to be temporally prioritized over other streams. For example, a higher priority stream may be allocated to a higher priority queue whereas a lower priority stream may be allocated to a lower priority queue. Again, these terms lower and higher are relative terms used relative to one another only not absolute terms referring to any absolute level. In any event, this may allow some bundles to be temporally prioritized for delivery over other bundles.

In some embodiments, each bundle transferred may optionally be assigned a counter value (e.g., a bundle counter value) from a bundle counter 793. The bundle counter is shown in the security component but may also be elsewhere. As shown, B0 may be assigned a counter value of 0, B3 a counter value of 1, B1 a counter value of 0, and B2 a counter value of 1. By way of example, the source platform (e.g., the source security component) may have a migration bundle counter or counter. The counter may represent a per-stream monotonically increasing (or decreasing) migration bundle counter. It may start from an initial value (e.g., 0, 1, or some desired value) and may be monotonically increased (e.g., incremented) or alternatively monotonically decreased (e.g., decremented) for each bundle put into a stream. By way of example, it may be represented as a 32-bit, 64-bit, or other value. Each bundle migrated may be associated with its counter value reflecting the order in which it is migrated (e.g., the counter value may be stored in metadata of the bundle). For example, in some embodiments, the bundle export primitive 756-2 as part of causing a bundle to be exported, may introduce the current bundle counter value into the bundle (e.g., into a field of the metadata of the bundle). For example, in TDX the SEAMCALL TDH.EXPORT.PAGE may do this.

In such embodiments, the counter values may help to allow enforcing a certain ordering migration (e.g., import at the destination) of the bundles. The migration may have an initial in-order phase or portion in which the bundles should be delivered in-order (e.g., in sequential order). During live migration, this in-order phase may occur at times when the source protected VM continues to run on the source platform (e.g., and change its memory state) and before the migrated protected VM starts to run on the destination platform (e.g., and starts to change its memory state). A newer (e.g., fresher) export of the same memory page should be imported after an older (e.g., stale) export of the same page so that the newer memory page replaces the older memory page instead of the reverse. Furthermore, for any memory page that has been migrated during the in-order phase, the most up-to-date version of that page should be migrated before the in-order phase ends. During the in-order stage, any specific private memory page (and any of its aliases in the case of nested VMMs) may be migrated using a specific stream. Within each migration stream, the memory state (e.g., bundles) may be migrated (e.g., imported at the destination) in-order. The counter values may be used for this purpose. Export or import operations using a specific migration stream should generally be serialized with concurrency supported mainly between streams. The destination platform may enforce the order. For example, the destination platform may maintain an analogous counter (e.g., a next bundle counter) that it used to verify and enforce that all exported state has been imported (in-order) at the destination platform. For instance, the destination platform may check that the bundle counter value in the received bundle equals or is otherwise compatible with the expected counter value maintained locally (e.g., the next bundle counter value), and if the bundle verification succeeds to import the bundle and increment or otherwise update the local expected counter value (e.g., the next bundle counter value) to account for the imported bundle. For example, in some embodiments, a VMM of the destination may issue or use a bundle import primitive (in TDX the SEAMCALL TDH.IMPORT.PAGE) that a destination security component (e.g., a TDX module) may implement to perform such verification. This may help to guarantee proper age ordering of memory exports and imports during live updates, when multiple copies of the same page may be migrated. Such proper ordering may be desirable both for security reasons (e.g., to help prevent replay type attacks) and performance reasons.

In some embodiments, the migration may use Advanced Encryption Standard (AES) in Galois/Counter Mode (GCM) to transfer bundles or other memory state between the source and destination platform platforms. The AES-GCM protocol may help to ensure that memory state is migrated in-order between the source and destination platform. By way of example, the bundle counter may be incorporated to construct the non-repeated initialization value (IV) used for the AES-GCM (optionally along with other metadata such as stream context, other metadata of the bundles, etc.). Also, in some embodiments, a further monotonically increasing counter (e.g., an IV_COUNTER) may optionally be included in the AES-GCM IV. It may start from a value (e.g., 1) and be incremented each time AES-GCM is used to encrypt a bundle even if data is discarded and not used for migration.

In some embodiments, the migration may optionally have a later out-of-order phase or portion (e.g., a stop and copy phase, a post-copy stage, etc.) in which the bundles are not required to be delivered in-order and may be delivered out-of-order. Such an out-of-order phase or portion is not required but may help to improve performance. During the out-of-order phase, the source protected VM does not run, and therefore its memory and non-memory state may not change. As a result, the order in which pages are migrated in the out-of-order phase is not as important as in the in-order phase. Furthermore, the host VMM may assign exported pages (even multiple copies of the same exported page) to different priority queues, as previously described. For example, this may be used to prioritize migration of certain types of pages over others (e.g., to prioritize on post-copy pages on demand after the destination protected VM starts running) Note also that the same stream queues can be used for both in-order and out-of-order. The semantic use of the queues is up to the host VMM. Non-memory state can only be migrated once; there is no override of older migrated non-memory state with a newer one.

In the in-order import phase the destination VMM can import page for guest physical addresses (GPAs) that are free, and it may also reload newer versions of pages to previously imported and present GPA addresses. In the out-of-order import phase, import may only be allowed to non-present GPA addresses. At this stage, all memory state on the source platform is guaranteed to be immutable, and the latest version of all pages exported so far are guaranteed to have been imported. Thus, the order of out-of-order import is not relevant. This may allow optionally using a separate migration stream and/or queue for higher-priority, lower-latency updates (e.g., to implement post-copy by allowing the TD to run and migrate memory pages on demand at a high priority, based on EPT violation).

V. Tokens to Control Migration

Figure 8:
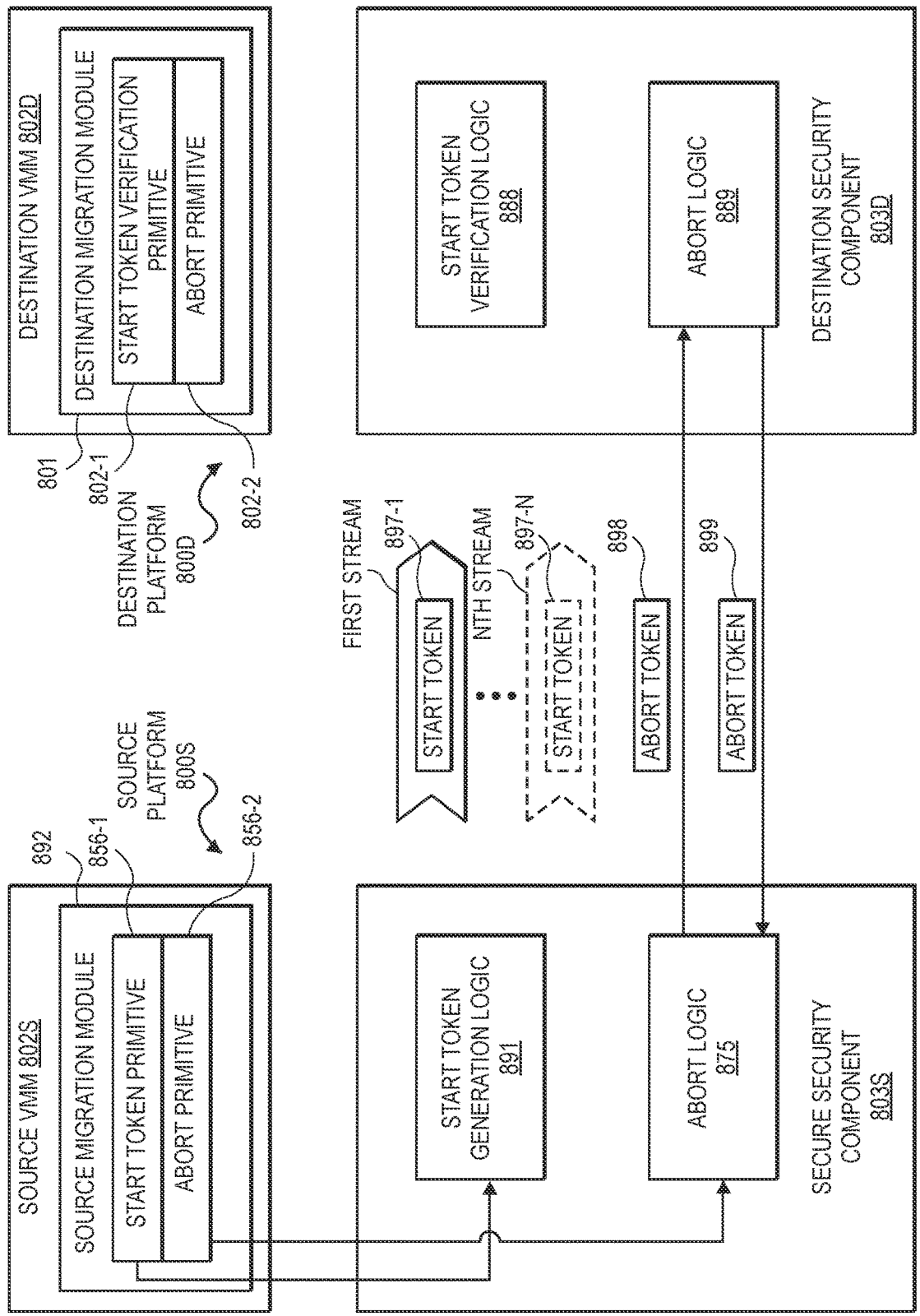
FIG. 8 is a block diagram showing use of tokens to control migration of a protected virtual machine from a source platform to a destination platform, according to some embodiments.

FIG. 8 is a block diagram showing use of tokens 897-1, 897-N 898, 899, to control migration of a protected VM from a source platform 800S to a destination platform 800D, according to some embodiments. The source and destination platforms may each be servers or other computer systems and may be similar to or the same as others described herein (e.g., those of FIG. 1, FIG. 2, FIG. 5, etc.). The source platform includes a source security component (e.g., a TDX module, a platform security processor, etc.), which may optionally be similar to or the same as others described herein (e.g., the source security component of FIG. 1, the TDX module of FIG. 5, etc.). The source security component may be operative to support and secure a source protected VM, which may optionally be similar to or the same as others described herein (e.g., source protected VM 105S of FIG. 1, source trust domain 505S of FIG. 5, etc.). The source platform also has a VMM, which may optionally be similar to or the same as others described herein (e.g., the source VMM 102S of FIG. 1, the TDX-aware host VMM 556S of FIG. 5, etc.).

The tokens may broadly represent any message or signal that may be used to convey their intended meaning (e.g., that they are a start token, that they are an abort token, etc.). In some embodiments, the tokens may optionally be formatted as a migration bundle, without a memory page contents, but having metadata indicating it is a token (e.g., in some cases a start token, in other cases an abort token). Alternatively, the tokens may be other types of messages, signals, or transmissions.

In some embodiments, one or more start tokens 897-1, 897-2 may be used to verify or ensure proper in-order export of protected VM memory content (e.g., bundles). The one or more start tokens may be used as indicators or markers to indicate or mark the end of the in-order phase of migration and/or the start of the out-of-order phase and/or the point at which the destination protected VM may start to run. They may be used to implement a rendezvous point to verify or enforce that all the in-order migration bundles or state across all streams (e.g., the bundles B0, B1, B2, and so on in FIG. 7) exported prior to the start token have been imported before the import of the start token and the out-of-order phase starts and the destination protected VM may start to execute. The start token may be used to verify or ensure that no newer version of any memory page exported prior to the start token exists on the source platform.

In some embodiments, a source VMM 802S may cause the one or more start tokens 897-1, 897-2 to be generated and transmitted to the destination platform 802D to communicate information about an end to an in-order phase of the migration, such as was described above for FIG. 7. For example, the source VMM may issue or use a start token command primitive 856-1 to cause start token generation logic 891 of a source security component 803S to generate a start token 897-1 and cause it to be transmitted to the destination platform. For example, in a TDX implementation, the source VMM may issue or use a TDH.EXPORT.STATE.DONE instruction leaf (as an example embodiment of the start token primitive 891) to call TDH.EXPORT.STATE.DONE logic (as an example embodiment of start token generation logic 891) of a source TDX module (as an example embodiment of the source security component 803S) to perform its associated TDH.EXPORT.STATE.DONE operation to create and send a start token. In some embodiments, the VMM may cause use an instance of this command primitive to cause a start token to be generated and transmitted for each stream used during the in-order export phase of migration. Alternatively, a single start token may be caused to be transmitted from only the last active stream used in the in-order stage of the migration when it completes transmitting its bundles. When all the one or more start tokens that need to be transmitted for the particular implementation have been transmitted, then the source platform may start to enter the out-of-order phase. Export of memory contents may continue to support the out-of-order stage of the migration.

The destination platform 802D may receive the start tokens 897-1, 897-2 and may use them to verify or ensure proper in-order export of protected VM memory content (e.g., bundles). In some embodiments, the destination VMM may use the start tokens as indicators or markers to indicate or mark the end of the in-order phase of migration and/or the start of the out-of-order phase and/or the point at which the destination protected VM may start to run. The destination VMM may use the start tokens to implement a rendezvous point to verify or enforce that all the in-order migration bundles or state (across all streams) exported prior to the start token have been imported by the destination platform before the import of the start token and/or the out-of-order phase starts and/or the destination protected VM may start to execute. The destination VMM may use the start tokens to verify or ensure that no newer version of any memory page exported prior to the start token exists on the source platform.

The destination VMM may issue command primitives to process each of the complete set of one or more start tokens as intended for the particular design. For example, the destination VMM may issue or use a start token verification command primitive 802-1 to cause start token verification logic 888 of a destination security component 803D to verify a corresponding start token. For example, in a TDX implementation, the destination VMM may issue or use a TDH.IMPORT.STATE.DONE instruction leaf (as an example embodiment of the start token verification command primitive 802-1) to call TDH.IMPORT.STATE.DONE logic (as an example embodiment of start token verification logic 888) of a destination TDX module (as an example embodiment of the destination security component 803D) to perform its associated TDH.IMPORT.STATE.DONE operation to process and verify a corresponding start token. If the verification fails, it may lead to the generation and sending of an abort token, as discussed further below. The start token verification primitive (e.g., an TDH.IMPORT.STATE.DONE instruction leaf) may be executed once for each streams and corresponding start token used in the in-order phase. The last invoked start token verification primitive may cause transition to a state that ends the in-order phases and starts the out-of-order export and import phases respectively. Memory import may then continue out-of-order (e.g., in a post-copy stage). In some cases, pages may only be imported if their guest physical address is free.

Various migration abort mechanisms are available to abort the migration. In some cases, the migration may be aborted proactively by the source platform (e.g., the source VMM) before a start token (e.g., one of start tokens 897-1, 897-2) has been generated. For example, the source VMM 802S may issue or use an abort command primitive 856-2 to cause abort logic 875 of the source security component 803S to generate an abort token 898 and cause it to be transmitted to the destination platform. For example, in a TDX implementation, the source VMM may issue or use a TDH.EXPORT.ABORT instruction leaf (as an example embodiment of the abort primitive 856-2) to call TDH.EXPORT.ABORT logic (as an example embodiment of abort logic 875) of the source TDX module (as an example embodiment of the source security component 803S) to perform its associated TDH.EXPORT.ABORT operation to generate an abort token and cause it to be transmitted to the destination platform. The transmission of the abort token may abort the migration and allow the source TD to become runnable again. The abort token may be used to provide a guarantee that the destination protected VM will not execute on the destination platform, and therefore the source protected VM on the source platform may execute.

If a start token (e.g., one of the start tokens 897-1, 897-2) has already been generated, the destination platform 802D may generate an abort token 899 and transmit it to the source platform. For example, the destination VMM may issue or use an abort command primitive to cause abort logic 889 of the destination security component 803D to generate an abort token 899 and cause it to be transmitted to the source platform. For example, in a TDX implementation, the destination VMM may issue or use a TDH.IMPORT.ABORT instruction leaf (as an example embodiment of the abort primitive 802-2) to call TDH.IMPORT.ABORT logic (as an example embodiment of abort logic) of a destination TDX module (as an example embodiment of the destination security component 803D) to perform its associated TDH.IMPORT.ABORT operation to generate an abort token and cause it to be transmitted to the source platform. The source platform may receive and process the abort token 899, use it to abort the migration, and allow the source TD to become runnable again. For example, the source VMM may issue or use the abort command primitive 856-2 to process the abort token 899 received from the destination platform and if it is valid resume execution of the source protected VM. For instance, in a TDX implementation, the source VMM may issue or use the TDH.EXPORT.ABORT instruction leaf, to call the TDH.EXPORT.ABORT logic of the source TDX module to perform its associated TDH.EXPORT.ABORT operation to checks the validity of the abort token 899. If the validity of the abort token is confirmed, then the migration may be aborted and the source TD may execute. Other import failures may also cause an abort such as an improper or wrong order sequence of page import, a failed verification check on a start token, or the like. When the import has failed or the migration aborted, the destination protected VM may not run and may be torn down. Components, features, and details described for any of FIGS. 2, 3, 4, 6, 7, and 8 may also optionally apply to any of FIGS. 1 and 5. Components, features, and details described for any of the apparatus may optionally apply to any of the methods disclosed herein, which in embodiments may optionally be performed by and/or with such apparatus.

VI. Example TDX Instructions

TDH.Export.Page Instruction

Used by host VMM to export a 4 KB or a 2 MB TD private memory page as a migration bundle in shared memory, which includes an MBMD and either a single 4 KB or 2 MB page or a set of 512 4 KB pages, encrypted with the migration session key. Also captures Secure-EPT GPA to HPA mapping and attributes. The migration bundle is protected by a MAC that is stored in the MBMD. It is interruptible. The host VMM is expected to invoke it in a loop until it returns with either a success indication or with a non-recoverable error indication.

As input operands, RAX has the SEAMCALL instruction leaf number. RCX has EPT mapping information: (1) bits [2:0] the level of the Secure EPT entry that maps the private page to be exported: either 0 (4 KB) or 1 (2 MB); (2) bits [51:12] Bits 51:12 of the guest physical address of the private page to be exported. RDX has HPA of the source TD's TDR page. R8 has HPA (including HKID bits) and size (e.g., in bytes) of memory of a memory buffer to use for MBMD. R9 has HPA, type and size of a destination page or a migration page list. R10 has information about the migration stream and resume flag: (1) bits [31:0] the migration stream index; (2) bit-63 to be 0 to indicate a new invocation or 1 to indicate a resumption of a previously interrupted operation.

The operation checks the following conditions 1 to 8. 1. The TDR page metadata in PAMT must be correct (PT must be PT_TDR). 2. The TD is not in a FATAL state (TDR.FATAL is FALSE). 3. The TD keys are configured on the hardware (TDR.LIFECYCLE_STATE is TD_KEYS_CONFIGURED). 4. TDCS is allocated (TDR.NUM_TDCX is the required number). 5. TDCS.OP_STATE is either LIVE_EXPORT, PAUSED_EXPORT or POST_EXPORT. 6. The migration stream index is correct: 6.1. If the export is in the in-order phase (TDCS.OP_STATE is either LIVE_EXPORT or PAUSED_EXPORT): 6.1.1. The migration stream index matches the output of a hash function of the source page GPA and LEVEL and of TDCS.NUM_IN_ORDER_MIGS, as defined in 16.3.1. 6.2. Else (the export is in the out-of-order phase): 6.2.1. The migration stream index is lower than TDCS.NUM_MIGS. 7. The migration stream's ENABLED flag is TRUE. 8. The buffer provided for MBMD is large enough and fits within a 4 KB page. If the checks are successful, the operation does the following operation 9:9. If the RESUME input flag is 1, indicating that this is a resumption of a previously interrupted TDH.EXPORT.PAGE: 9.1. Check that the stream context's INTERRUPTED_FUNC contains TDH.EXPORT.PAGE's leaf number. 9.2. Check that the current inputs (GPA and level, content of R9) are the same as saved in the stream context when the function was interrupted. If passed the operation does the following 10-13:10. Walk the SEPT based on the GPA and level operands and find the leaf entry for the page. 11. If the TD is not paused (TDCS.OP_STATE is LIVE_EXPORT): 11.1. Check that the page is blocked for writing; its SEPT state must be one of the *BLOCKEDW states. 11.2. Check TLB tracking based on the page's PAMT.BEPOCH. 12. Else: 12.1. Check that the page is not blocked (SEPT state is not BLOCKED). 13. VM Nest: Check that all aliases have been blocked for writing (PAMT.ALIAS_COUNT=PAMT.BLOCKW_COUNT).

If passed the operation does the following operation 14:14. If the RESUME input flag is 0, indicating that this is a new (not resumed) invocation of TDH.EXPORT.PAGE: 14.1. If the migration stream's INITIALIZED flag is FALSE: 14.1.1. Initialize the migration stream and set its INITIALIZED flag to TRUE. 14.2. Build the 96b IV for this migration bundle by concatenating 0 as the direction bit, the stream index and the stream context's NEXT_IV-COUNTER as described in Table 4.2. 14.3. Accumulate MAC in the stream context based on the MAC'ed fields of MBMD. See 8.3.1 for details. 14.4. Write the MBMD fields, excluding MAC, to the memory buffer provided by the host VMM. 14.5. Increment the stream context's NEXT_IV_COUNTER. If passed the operation does the following operations 15 and 16:15. If the SEPT state is one of the non-pending *BLOCKEDW states, write the migration data: 15.1. If the page size is 2 MB, repeat exporting 4 KB chunks until all page is exported or until a pending interrupt is detected: 15.1.1. If a page list has been provided, get the 4 KB page HPA from it. Otherwise, use the provided page HPA. 15.1.2. Use the migration stream context to encrypt a 4 KB chunk of the page into the destination data page and update the MAC calculation. 15.1.3. If there is a pending interrupt 15.1.3.1. Save intermediate state (GPA and level, number of 4 KB chunks saved so far, content of R9) in the stream context. 15.1.3.2. Set the stream context's INTERRPTED_FUNC field to the TDH.EXPORT.PAGE leaf number. 15.1.3.3. Terminate TDH.EXPORT.PAGE with a TDX_INTERRUPTED_RESUMABLE status. 15.1.4. Else, advance to the next entry in the page list, if applicable, or to the next 4 KB chunk otherwise. 15.2. Else (page size is 4 KB), use the migration stream context to encrypt the page into the destination data page and update the MAC calculation. 16. Else (SEPT state is one of the PENDING_* states), no page data exists, and only MBMD is exported.

If passed the operation does the following operations 17-20:17. Write the accumulated MAC to the MBMD in memory. 18. Update the SETP entry state and migration counters as follows: 18.1. If SEPT entry state is BLOCKEDW or PENDING_BLOCKEDW (i.e., this is the first time the page is being exported in this export session): 18.1.1. Set the SEPT entry state to EXPORTERD_BLOCKEDW or PENDING_EXPORTED_BLOCKEDW respectively. 18.1.2. Increment TDCS.MIG_COUNT. 18.2. Else (the SEPT state is EXPORTED_DIRTY_BLOCKEDW or PENDING_EXPORTED_DIRTY_BLOCKEDW (i.e., the page has been exported in this export session, and is dirty): 18.2.1. Set the SEPT entry state t to EXPORTERD_BLOCKEDW or PENDING_EXPORTED_BLOCKEDW respectively. 18.2.2. Decrement TDCS.DIRTY_COUNT. 19. Increment the steam context's NEXT_MB_COUNTER field. 20. Set the stream context's INTERRPTED_FUNC field to −1, indicating no interrupted function.

TDH.Export.State.Done Instruction

Used by host VMM to end the in-order export phase and generate and export a start token from the source SEAM to enable running the migrated TD on the destination platform. The start token is exported on the specified migration stream. After this instruction has been called for all migration streams, it ends the blackout phase for the paused source TD being migrated. The commitment protocol with tokens allows the counter based scheme to be used to enforce that all modified state must be exported, and all exported state must be imported on destination before the token encrypted using a subsequent counter is correctly authenticated and decrypted to allow the destination TD to be runnable.

Input operands include in RAX the SEAMCALL instruction leaf number, in RCX the HPA of the source TD's TDR page, in R8 the HPA and size of memory of a memory buffer to use for MBMD where bits [11:0] indicate the size of the memory buffer allocated for MBMD, in bytes, and bits [51:12] indicate the host physical address (including HKID bits). R10 indicates the migration stream index.

The operation checks the following conditions 1 to 10:1. The TDR page metadata in PAMT must be correct (PT must be PT_TDR). 2. The TD is not in a FATAL state (TDR.FATAL is FALSE). 3. The TD keys are configured on the hardware (TDR.LIFECYCLE_STATE is TD_KEYS_CONFIGURED). 4. TDCS is allocated (TDR.NUM_TDCX is the required number). 5. An export session is in progress and the TD has been paused: TDCS.OP_STATE is PAUSED_EXPORT. 6. The migration stream index is lower than TDCS.NUM_IN_ORDER_MIGS. 7. The migration stream's ENABLED flag is TRUE. 8. The buffer provided for MBMD is large enough and fits within a 4 KB page. 9. TDCS.DIRTY_COUNT is 0, indicating that no unexported newer versions of any memory page exported so far remain. Memory pages that have not yet been exported may remain, and may later be exported (out-of-order). 10. The TD mutable state has been exported (by TDH.EXPORT.STATE.TD).

If successful, the operation does the following 11 to 18:11. Increment TDCS.NUM_IN_ORDER_DONE. 12. If TDH.EXPORT.STATE.DONE has been executed for all other migration streams on which any export has been done during this migration session (TDCS.NUM_IN_ORDER_DONE==TDCS.NUM_IN_ORDER_MIGS): 12.1. Start the post-export phase: set the TD Operation sub-state to POST_EXPORT. 12.2. Set all migration streams' ENABLED flags to TRUE. 13. Else: 13.1. Set the current migration stream's ENABLED flag to FALSE. 14. If the migration stream's INITIALIZED flag is FALSE: 14.1. Initialize the migration stream is set its INITIALIZED flag to TRUE. 15. Build the 96b IV for this migration bundle by concatenating 0 as the direction bit, the stream index and the stream context's NEXT_IV_COUNTER as described in Table 4.2. 16. Create a start token MBMD. 17. Accumulate MAC based on the MAC'ed fields of MBMD and write to the MBMD's MAC field's value. See 8.3.1 for details. 18. Write the MBMD to the provided memory buffer.

TDH.Import.State.Done Instruction

Used by host VMM on the destination platform to consume a start token from a source SEAM received from the source platform to authorize the destination SEAM to allow the migrated TD to become runnable. If successful, and if it was successful on all other migration streams, mark the target TD as RUNNABLE (the source cannot be resumed). A failure marks the target TD as IMPORT_FAILED, and returns an abort token, and the destination TD is then guaranteed not to run. The commitment protocol with tokens allows the counter based scheme to be used to enforce that all modified state must be exported, and all exported state must be imported on destination before the token encrypted using a subsequent counter is correctly authenticated and decrypted to allow the destination TD to be runnable.

Input operands include in RAX the SEAMCALL instruction leaf number, in RCX the HPA of the source TD's TDR page, in R8 the HPA and size of memory of an MBMD structure in memory in which bits [11:0] indicate the size of the memory buffer containing MBMD, in bytes, and bits [51:12] indicate the host physical address (including HKID bits). In R10 is provided the migration stream index The operation checks the following conditions 1 to 8:1. The TDR page metadata in PAMT must be correct (PT must be PT_TDR). 2. The TD is not in a FATAL state (TDR.FATAL is FALSE). 3. The TD keys are configured on the hardware (TDR.LIFECYCLE_STATE is TD_KEYS_CONFIGURED). 4. TDCS is allocated (TDR.NUM_TDCX is the required number). 5. An import session is in progress and the TD-scope state has been imported: TDCS.OP_STATE is STATE_IMPORT. 6. The migration stream index is lower than TDCS.NUM_IN_ORDER_MIGS. 7. The migration stream's ENABLED flag is TRUE. 8. The buffer provided for MBMD is large enough and fits within a 4 KB page.

If successful, the operation does the following operations 9 to 10:9. Copy the MBMD into a temporary buffer. 10. Check the MBMD fields: 10.1. Check that SIZE is large enough. 10.2. Check that MB_TYPE indicates a token and MB_SUBTYPE indicates start token. 10.3. Check that MIGS_INDEX is the same as the input parameter. 10.4. Check that the MB_COUNTER value is equal to the migration stream's NEXT_MB_COUNTER. 10.5. Check that reserved fields are 0. If passed the operation does the following operations 11 to 13:11. If the migration stream's INITIALIZED flag is FALSE: 11.1. Initialize the migration stream and set its INITIALIZED flag to TRUE. 12. Build the 96b IV for this migration bundle by concatenating 0 as the direction bit, the stream index and the MBMD's IV_COUNTER as described in Table 4.2. 13. Accumulate MAC based on the MAC'ed fields of MBMD and check that the value is the same as the MBMD's MAC field's value. See 8.3.1 for details. If passed the operation does the following operations 14 to 17:14. Increment the stream context's NEXT_MB_COUNTER. 15. Increment TDCS.NUM_IN_ORDER_DONE. 16. If TDH.IMPORT.STATE.DONE has been executed for all other migration streams used during the in-order phase (TDCS.NUM_IN_ORDER_DONE is equal to TDCS.NUM_IN_ORDER_MIGS): 16.1. Start the out-of-order import phase: set TDCS.OP_STATE to POST_IMPORT. 16.2. Set all migration streams' ENABLED flags to TRUE. 17. Else: 17.1. Set the current migration stream's ENABLED flag to FALSE.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
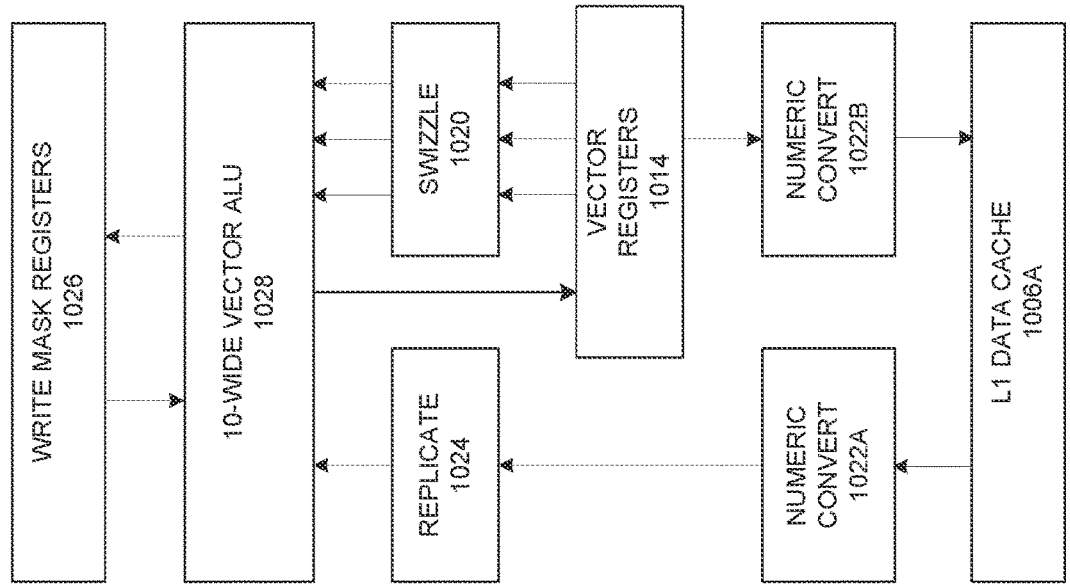
FIG. 10B is a block diagram of an embodiment of an expanded view of part of the processor core of FIG. 10A.
Figure 10A:
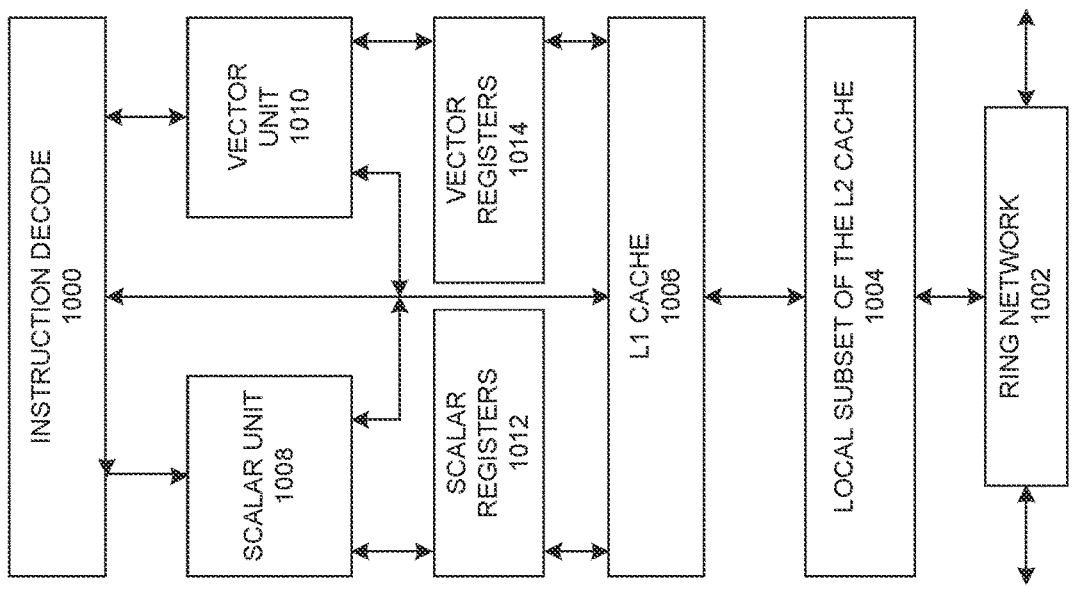
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
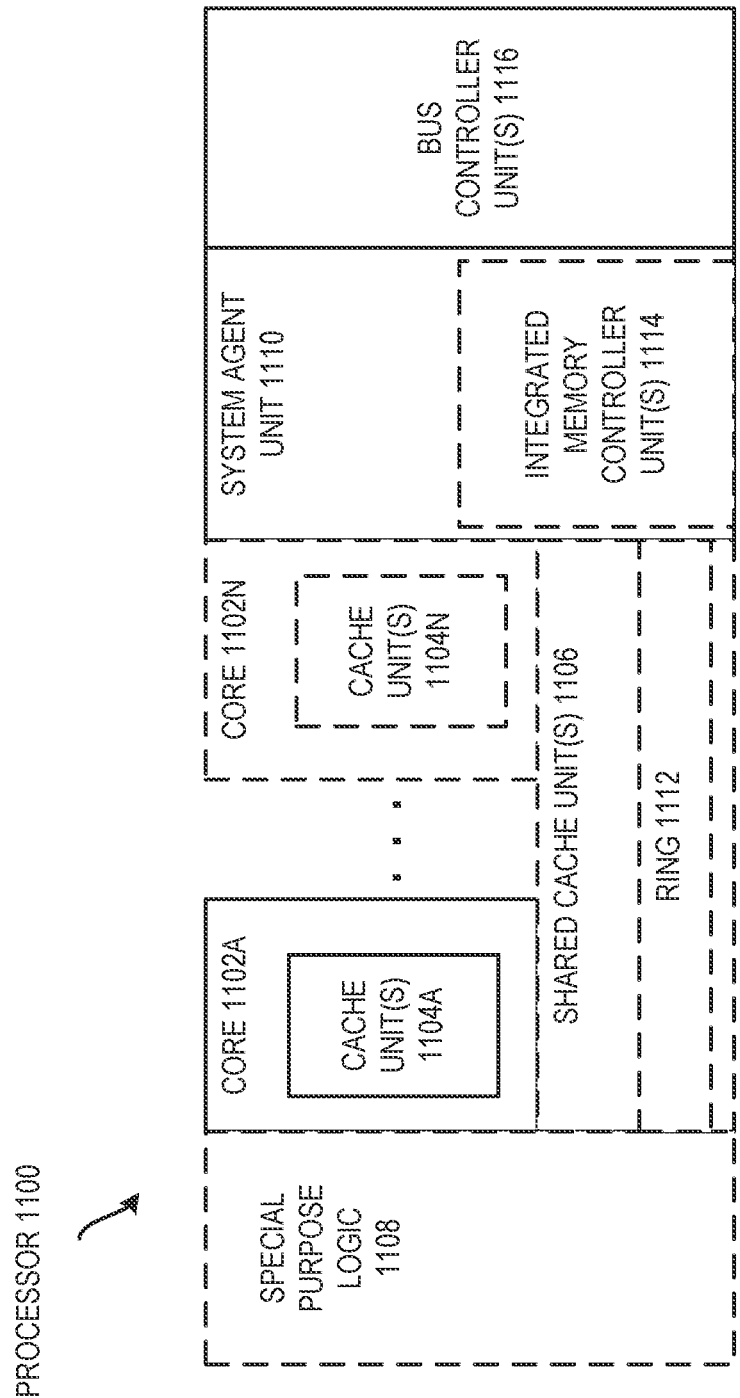
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
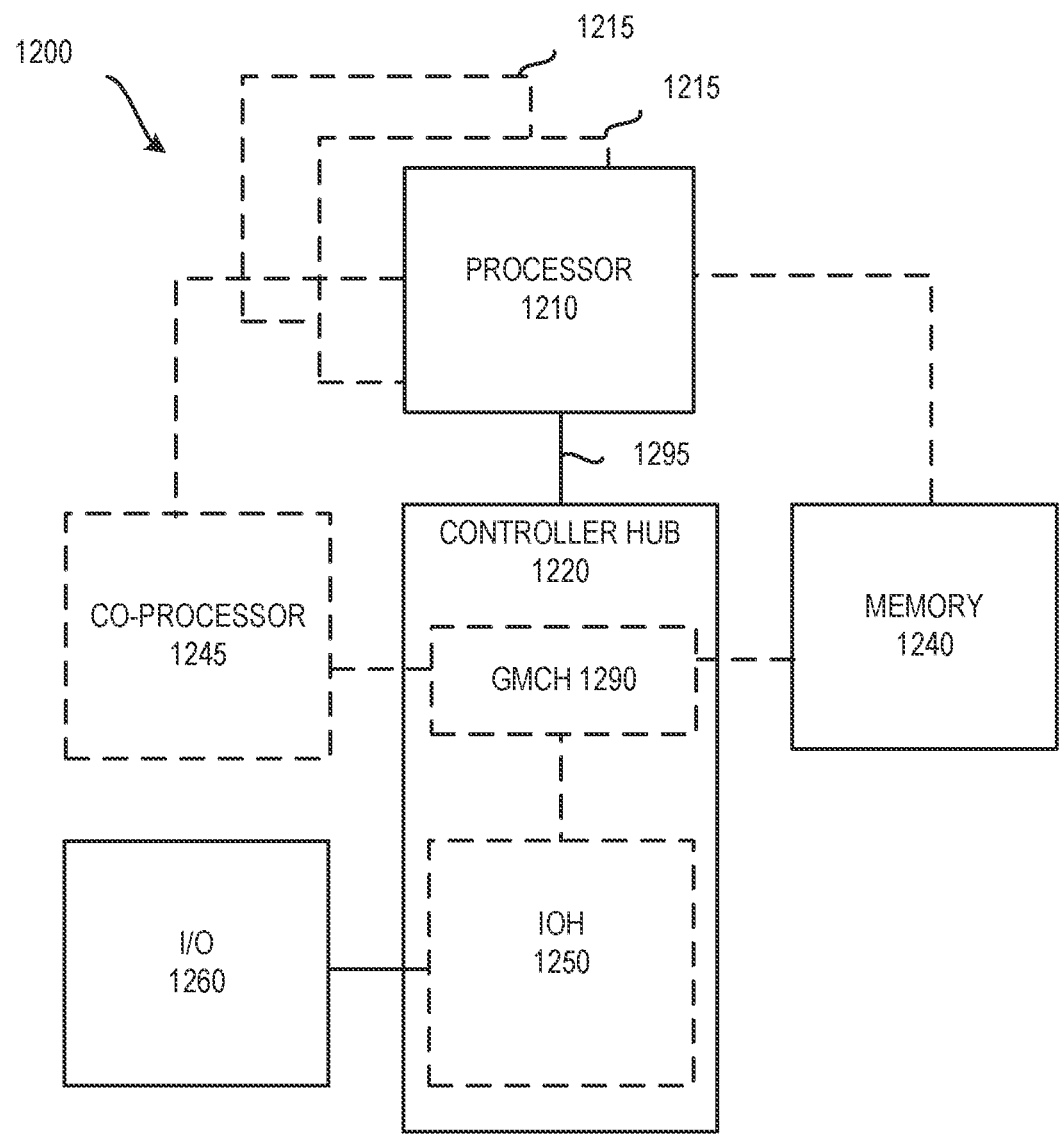
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
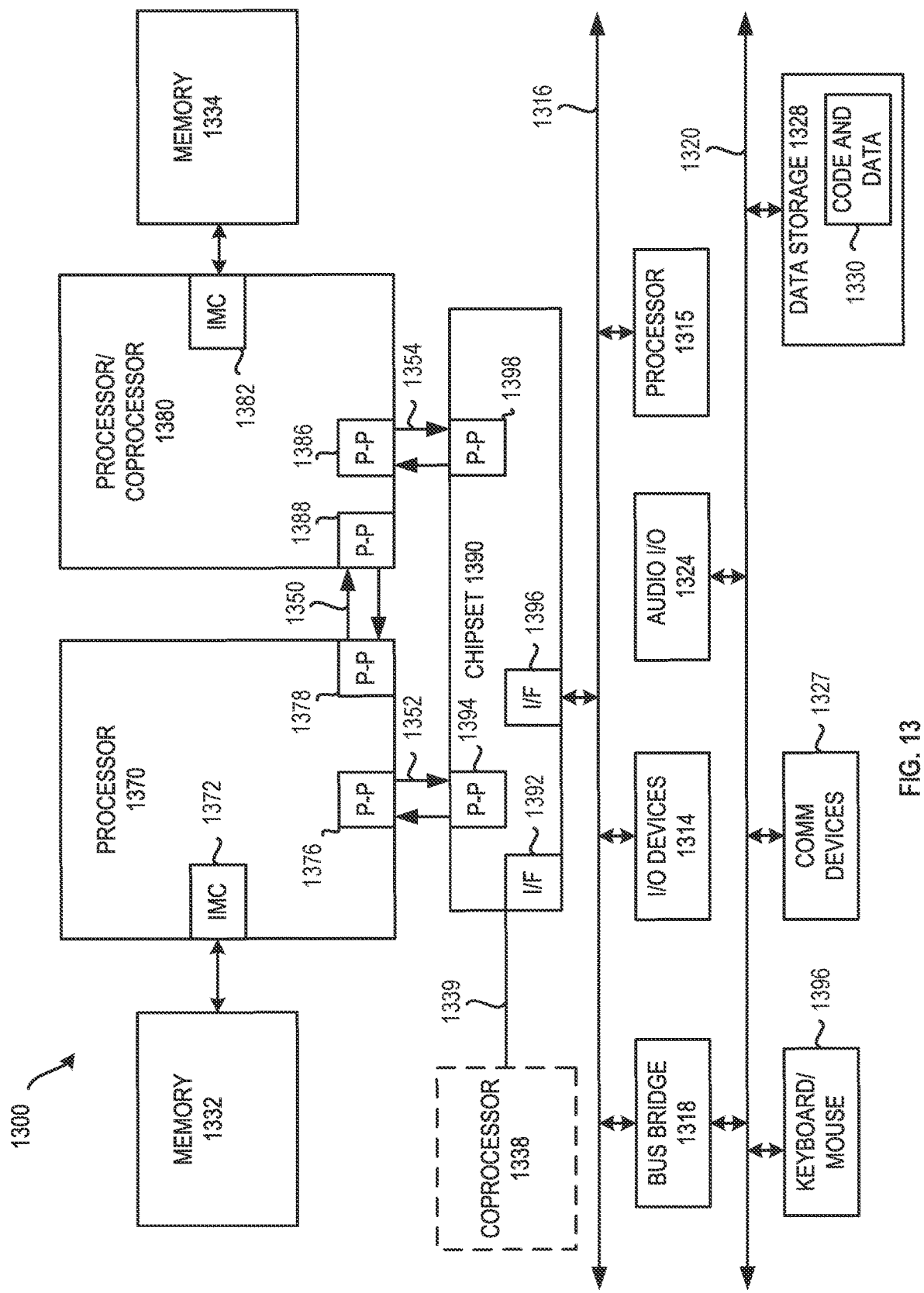
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
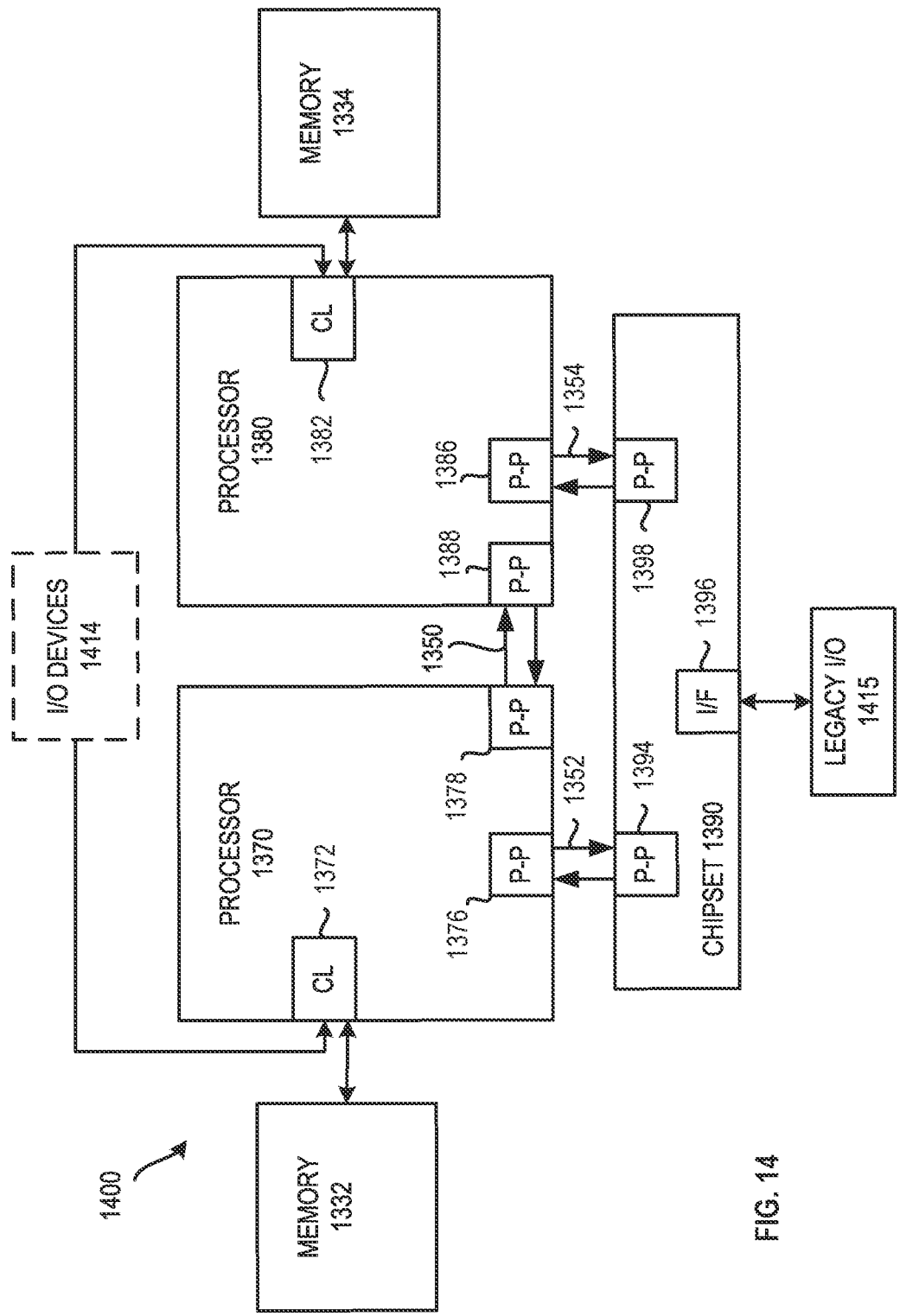
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
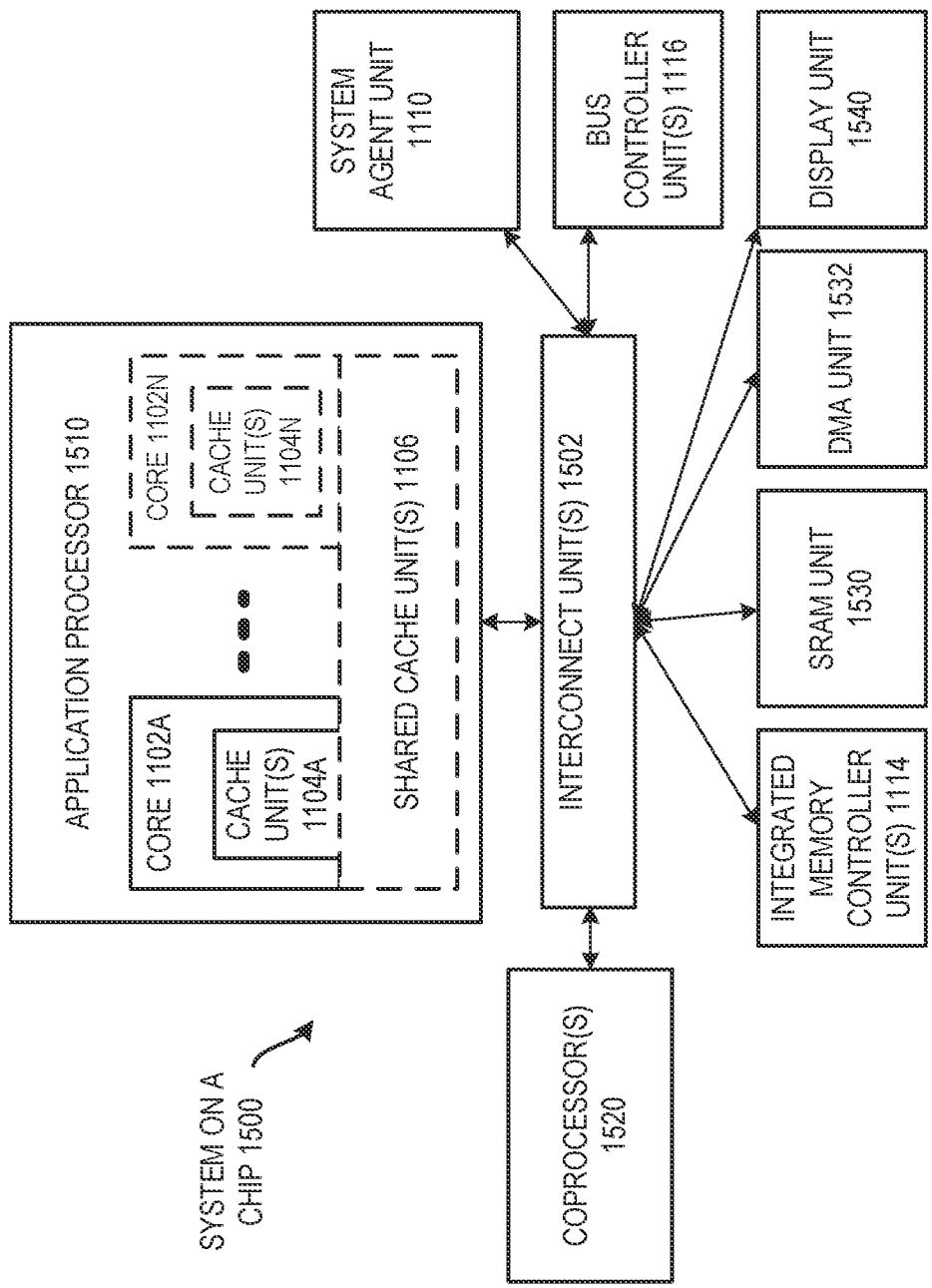
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
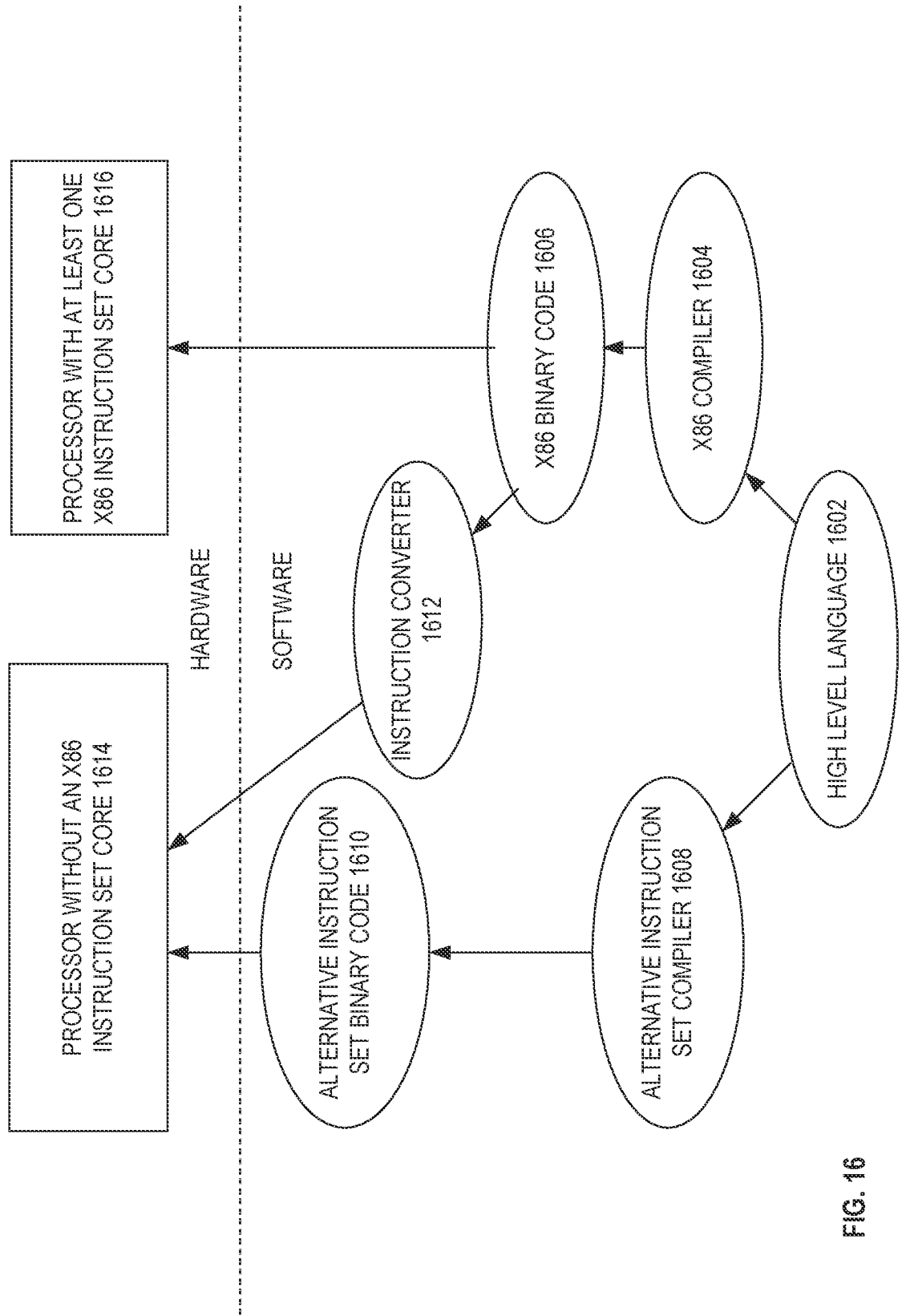
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The logic and modules disclosed herein may be implemented in hardware (e.g., integrated circuitry, transistors, logic gates, etc.), firmware (e.g., a non-volatile memory storing microcode, microinstructions, or other lower-level or circuit-level instructions), software (e.g., higher level instructions stored on a non-transitory computer readable storage medium), or a combination thereof (e.g., hardware and/or firmware potentially combined with some software). In some cases, where multiple logic or modules have been shown and described, where appropriate they may instead optionally be integrated together as a single logic or module. In other cases, where a single logic or module has been shown and described, where appropriate it may optionally be separated into two or more logic or modules.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

EXAMPLE EMBODIMENTS

The following examples pertain to further embodiments. Specifics in the examples may be used anywhere in one or more embodiments.

Example 1 is a method that includes enforcing that a plurality of bundles of state, of a first protected virtual machine (VM), received at a second platform over a stream, during an in-order phase of a migration of the first protected VM from a first platform to the second platform, are imported to a second protected VM of the second platform, in a same order that the plurality of bundles of state were exported from the first protected VM. The method also includes receiving a marker over the stream, the marker to mark an end of the in-order phase of the migration. The method also includes determining that all bundles of state exported from the first protected VM prior to export of the marker over the stream have been imported to the second protected VM. The method also includes starting an out-of-order phase of the migration based on the determination that said all bundles of the state exported from the first protected VM prior to export of the marker over the stream have been imported to the second protected VM.

Example 2 includes the method of Example 1, further including, in the out-of-order phase of the migration, allowing a second plurality of bundles of state to be imported to the second protected VM in a different order than an order the second plurality of bundles of state were exported from the first protected VM.

Example 3 includes the method of any one of Examples 1 to 2, further including starting execution of the second protected VM based on the determination that said all bundles of the state exported from the first protected VM prior to export of the marker over the stream have been imported to the second protected VM.

Example 4 includes the method of any one of Examples 1 to 3, optionally in which said enforcing includes enforcing values in the plurality of bundles of state, which are indicative of the order that the plurality of bundles of state were exported from the first protected VM, to be respectively consistent with values indicative of a number of the plurality of bundles of state imported into the second protected VM.

Example 5 includes the method of any one of Examples 1 to 4, further including optionally receiving a plurality of bundles of state of the first protected VM over a second stream, optionally processing the plurality of bundles of state received over the stream with a first virtual central processing unit (vCPU), and optionally processing the plurality of bundles of state received over the second with a second vCPU.

Example 6 includes the method of any one of Examples 1 to 5, further including optionally enforcing that a second plurality of bundles of state of the first protected VM, received at the second platform over a second stream during the in-order phase of the migration, are imported to the second protected VM, in a same order that the second plurality of bundles of state were exported from the first protected VM. The method also optionally includes receiving a second marker over the second stream. The method also optionally includes determining that all bundles of state exported from the first protected VM prior to export of the second marker over the second stream have been imported to the second protected VM prior to the determination that said all bundles of state exported from the first protected VM prior to the export of the marker over the stream have been imported to the second protected VM.

Example 7 includes the method of any one of Examples 1 to 6, further including receiving a marker over each of a plurality of streams used to convey bundles of state of the first protected VM to the second platform, and optionally in which receiving the marker over the stream includes receiving the marker over the stream after receiving the markers over the plurality of streams.

Example 8 includes the method of any one of Examples 1 to 7, optionally further including receiving a command primitive from a virtual machine monitor, and optionally in which said determining and said starting are performed responsive to the command primitive.

Example 9 includes the method of any one of Examples 1 to 8, optionally in which the second protected VM is a trust domain, and optionally further including maintaining state of the trust domain confidential from a virtual machine monitor of the second platform.

Example 10 includes the method of any one of Examples 1 to 9, optionally in which the stream is a counter-mode encrypted and authenticated stream.

Example 11 includes the method of any one of Examples 1 to 10, optionally in which the marker is encrypted with a migration capable key that is kept confidential from a VMM.

Example 12 is a non-transitory machine-readable storage medium storing a plurality of instructions that, if executed by a machine, to cause the machine to perform operations including to enforce that a plurality of bundles of state of a first protected virtual machine (VM), received at a second platform over a stream during an in-order phase of a migration of the first protected VM from a first platform to the second platform, are imported to a second protected VM of the second platform, in a same order that the plurality of bundles of state were exported from the first protected VM. The operations also include to determine whether all bundles of state exported from the first protected VM prior to export of a marker of an end of the in-order phase of the migration, which is to have been received over the stream, have been imported to the second protected VM. The operations also include to determine whether to start an out-of-order phase of the migration based on whether the determination is that said all bundles of the state exported from the first protected VM prior to export of the marker over the stream have been imported to the second protected VM.

Example 13 includes the non-transitory machine-readable storage medium of Example 12, optionally in which the instructions to determine whether to start the out-of-order phase of the migration further comprise instructions that, if executed by the machine, are to cause the machine to perform operations including to determine to start the out-of-order phase of the migration upon a determination that said all bundles of the state exported from the first protected VM prior to export of the marker over the stream have been imported to the second protected VM.

Example 14 includes the non-transitory machine-readable storage medium of any one of Examples 12 to 13, optionally in which the instructions to determine whether to start the out-of-order phase of the migration further comprise instructions that, if executed by the machine, are to cause the machine to perform operations including to determine to abort the migration upon a determination that said all bundles of the state exported from the first protected VM prior to export of the marker over the stream have not been imported to the second protected VM.

Example 15 includes the non-transitory machine-readable storage medium of any one of Examples 12 to 14, optionally in which the instructions further comprise instructions that, if executed by the machine, are to cause the machine to perform operations including to allow, in the out-of-order phase of the migration, a second plurality of bundles of state to be imported to the second protected VM in a different order than an order the second plurality of bundles of state were exported from the first protected VM during the out-of-order phase of the migration.

Example 16 includes the non-transitory machine-readable storage medium of any one of Examples 12 to 15, optionally in which the instructions further comprise instructions that, if executed by the machine, are to cause the machine to perform operations including to determine whether to start execution of the second protected VM based on whether the determination is that said all bundles of the state exported from the first protected VM prior to export of the marker over the stream have been imported to the second protected VM.

Example 17 includes the non-transitory machine-readable storage medium of any one of Examples 12 to 16, optionally in which the instructions to said enforce further comprise instructions that, if executed by the machine, are to cause the machine to perform operations including to enforce values in the plurality of bundles of state, which are indicative of the order that the plurality of bundles of state were exported from the first protected VM, to be respectively consistent with values indicative of a number of the plurality of bundles of state imported into the second protected VM.

Example 18 is an apparatus including a plurality of cores, and a non-transitory machine-readable storage medium. The non-transitory machine-readable storage medium stores a plurality of instructions, that, if executed by a machine, are to cause the machine to perform operations. The operations include to enforce that a plurality of bundles of state of a first protected virtual machine (VM), received at a second platform over a stream during an in-order phase of a migration of the first protected VM from a first platform to the second platform, are imported to a second protected VM of the second platform, in a same order that the plurality of bundles of state were exported from the first protected VM. The operations also include to determine whether all bundles of state exported from the first protected VM prior to export of a marker of an end of the in-order phase of the migration, which is to have been received over the stream, have been imported to the second protected VM. The operations also include to determine whether to start an out-of-order phase of the migration based on whether the determination is that said all bundles of the state exported from the first protected VM prior to export of the marker over the stream have been imported to the second protected VM.

Example 19 includes the apparatus of Example 18, optionally in which the instructions to determine whether to start the out-of-order phase of the migration further comprise instructions that, if executed by the machine, are to cause the machine to perform operations including to determine to start the out-of-order phase of the migration upon a determination that said all bundles of the state exported from the first protected VM prior to export of the marker over the stream have been imported to the second protected VM, and optionally to determine to abort the migration upon a determination that said all bundles of the state exported from the first protected VM prior to export of the marker over the stream have not been imported to the second protected VM.

Example 20 includes the apparatus of any one of Examples 18 to 19, optionally in which the plurality of bundles of state are encrypted with a migration capable key according to a counter-mode encryption, further including a protected migration service VM to authenticate the second platform to the first platform, and optionally in which the migration capable key is not kept confidential from the protected migration service VM but is kept confidential from a virtual machine monitor (VMM).

Example 21 includes the apparatus of any one of Examples 18 to 20, optionally in which the marker is encrypted and integrity protected according to counter-mode encryption with a migration capable key that is kept confidential from a virtual machine monitor (VMM).

Example 22 is an apparatus including a central processing unit (CPU), and a processor coupled with the CPU to enforce that a plurality of bundles of state of a first protected virtual machine (VM), received at a second platform over a stream during an in-order phase of a migration of the first protected VM from a first platform to the second platform, are imported to a second protected VM of the second platform, in a same order that the plurality of bundles of state were exported from the first protected VM. The processor coupled with the CPU is also to determine whether all bundles of state exported from the first protected VM prior to export of a marker of an end of the in-order phase of the migration, which is to have been received over the stream, have been imported to the second protected VM. The processor coupled with the CPU is also to determine whether to start an out-of-order phase of the migration based on whether the determination is that said all bundles of the state exported from the first protected VM prior to export of the marker over the stream have been imported to the second protected VM.

Example 23 includes the apparatus of Example 22, optionally in which the processor coupled with the CPU is optionally also to determine to start the out-of-order phase of the migration upon a determination that said all bundles of the state exported from the first protected VM prior to export of the marker over the stream have been imported to the second protected VM. The processor coupled with the CPU is optionally also to determine to abort the migration upon a determination that said all bundles of the state exported from the first protected VM prior to export of the marker over the stream have not been imported to the second protected VM.

Example 24 includes the apparatus of any one of Examples 22 to 23, optionally in which the plurality of bundles of state are optionally encrypted with a migration capable key according to a counter-mode encryption, and optionally further including a protected migration service VM to authenticate the second platform to the first platform, and optionally in which the migration capable key is not kept confidential from the protected migration service VM but is kept confidential from a VMM.

Example 25 includes the apparatus of any one of Examples 22 to 24, optionally in which the marker optionally is encrypted and integrity protected according to counter-mode encryption with a migration capable key that is optionally kept confidential from a VMM.

Example 26 includes the apparatus of any one of Examples 22 to 25, optionally in which the stream is optionally a counter-mode encrypted and optionally authenticated stream.

Example 27 is an apparatus operative to perform the method of any one of Examples 1 to 11.

Example 28 is an apparatus that includes means for performing the method of any one of Examples 1 to 11.

Example 29 is an apparatus that includes any combination of modules and/or units and/or logic and/or circuitry and/or means operative to perform the method of any one of Examples 1 to 11.

Example 30 is an optionally non-transitory and/or tangible machine-readable medium, which optionally stores or otherwise provides instructions that if and/or when executed by a computer system or other machine are operative to cause the machine to perform the method of any one of Examples 1 to 11.

What is claimed is:

1. An apparatus comprising:
   a processor; and
   a non-transitory machine-readable storage medium, the non-transitory machine-readable storage medium storing a plurality of instructions, the plurality of instructions, if executed by the processor, to cause the processor to perform operations comprising to:
   enforce, in response to execution of bundle import control primitives by circuitry of the processor, that a plurality of bundles of state of a first protected virtual machine (VM), received at a second platform over a stream during an in-order phase of a migration of the first protected VM from a first platform to the second platform, are imported and stored to a memory of a second protected VM of the second platform, in a same order that the plurality of bundles of state were exported from the first protected VM;
   determine whether all bundles of state exported from the first protected VM prior to export of a marker of an end of the in-order phase of the migration, which is to have been received over the stream, have been imported to the second protected VM; and
   determine whether to start an out-of-order phase of the migration based on whether the determination is that said all bundles of the state exported from the first protected VM prior to export of the marker over the stream have been imported to the second protected VM.

2. The apparatus of claim 1, wherein the instructions to determine whether to start the out-of-order phase of the migration further comprise instructions that, if executed by the processor, are to cause the processor to perform operations comprising to:
   determine to start the out-of-order phase of the migration upon a determination that said all bundles of the state exported from the first protected VM prior to export of the marker over the stream have been imported to the second protected VM;
   determine to abort the migration upon a determination that said all bundles of the state exported from the first protected VM prior to export of the marker over the stream have not been imported to the second protected VM; and
   in response to determining to abort the migration, send an abort token to the first platform, the abort token to indicate the first protected VM on the first platform is allowed to restart after its execution has stopped.

3. The apparatus of claim 1, wherein the plurality of bundles of state are encrypted with a migration capable key according to a counter-mode encryption, further comprising a protected migration service VM to authenticate the second platform to the first platform, and wherein the migration capable key is not kept confidential from the protected migration service VM but is kept confidential from a virtual machine monitor (VMM).

4. The apparatus of claim 1, wherein the marker is encrypted and integrity protected according to counter-mode encryption with a migration capable key that is kept confidential from a virtual machine monitor (VMM).

5. An apparatus comprising:
   a central processing unit (CPU); and
   a processor coupled with the CPU, the processor comprising:
   first circuitry to enforce, in response to execution of control primitives by circuitry of the processor, that a plurality of bundles of state of a first protected virtual machine (VM), received at a second platform over a stream during an in-order phase of a migration of the first protected VM from a first platform to the second platform, are imported and stored to a memory of a second protected VM of the second platform, in a same order that the plurality of bundles of state were exported from the first protected VM;
   second circuitry to determine whether all bundles of state exported from the first protected VM prior to export of a marker of an end of the in-order phase of the migration, which is to have been received over the stream, have been imported to the second protected VM; and
   third circuitry to determine whether to start an out-of-order phase of the migration based on whether the determination is that said all bundles of the state exported from the first protected VM prior to export of the marker over the stream have been imported to the second protected VM.

6. The apparatus of claim 5, wherein the third circuitry is to:
   determine to start the out-of-order phase of the migration upon a determination that said all bundles of the state exported from the first protected VM prior to export of the marker over the stream have been imported to the second protected VM;
   determine to abort the migration upon a determination that said all bundles of the state exported from the first protected VM prior to export of the marker over the stream have not been imported to the second protected VM; and
   in response to determining to abort the migration, send an abort token to the first platform, the abort token to indicate that the first protected VM on the first platform is allowed to restart after its execution has stopped.

7. The apparatus of claim 5, wherein the plurality of bundles of state are encrypted with a migration capable key according to a counter-mode encryption, further comprising a protected migration service VM to authenticate the second platform to the first platform, and wherein the migration capable key is not kept confidential from the protected migration service VM but is kept confidential from a virtual machine monitor (VMM).

8. The apparatus of claim 5, wherein the marker is encrypted and integrity protected according to counter-mode encryption with a migration capable key that is kept confidential from a virtual machine monitor (VMM).

9. The apparatus of claim 5, wherein the stream is a counter-mode encrypted and authenticated stream.

10. A method comprising:
enforcing, in response to execution of control primitives by circuitry of a processor, that a plurality of bundles of state, of a first protected virtual machine (VM), received at a second platform over a stream, during an in-order phase of a migration of the first protected VM from a first platform to the second platform, are imported and stored to a memory of a second protected VM of the second platform, in a same order that the plurality of bundles of state were exported from the first protected VM;
receiving a marker over the stream, the marker to mark an end of the in-order phase of the migration;
determining that all bundles of state exported from the first protected VM prior to export of the marker over the stream have been imported to the second protected VM; and
starting an out-of-order phase of the migration based on the determination that said all bundles of the state exported from the first protected VM prior to export of the marker over the stream have been imported to the second protected VM.

11. The method of claim 10, further comprising, in the out-of-order phase of the migration, allowing a second plurality of bundles of state to be imported to the second protected VM in a different order than an order the second plurality of bundles of state were exported from the first protected VM.

12. The method of claim 10, further comprising starting execution of the second protected VM based on the determination that said all bundles of the state exported from the first protected VM prior to export of the marker over the stream have been imported to the second protected VM.

13. The method of claim 10, wherein said enforcing comprises enforcing values in the plurality of bundles of state, which are indicative of the order that the plurality of bundles of state were exported from the first protected VM, to be respectively consistent with values indicative of a number of the plurality of bundles of state imported into the second protected VM.

14. The method of claim 10, further comprising:
receiving a plurality of bundles of state of the first protected VM over a second stream;
processing the plurality of bundles of state received over the stream with a first virtual central processing unit (vCPU); and
processing the plurality of bundles of state received over the second stream with a second vCPU.

15. The method of claim 10, further comprising:
enforcing that a second plurality of bundles of state of the first protected VM, received at the second platform over a second stream during the in-order phase of the migration, are imported to the second protected VM, in a same order that the second plurality of bundles of state were exported from the first protected VM;
receiving a second marker over the second stream; and
determining that all bundles of state exported from the first protected VM prior to export of the second marker over the second stream have been imported to the second protected VM prior to the determination that said all bundles of state exported from the first protected VM prior to the export of the marker over the stream have been imported to the second protected VM.

16. The method of claim 10, further comprising receiving a marker over each of a plurality of streams used to convey bundles of state of the first protected VM to the second platform, and wherein receiving the marker over the stream comprises receiving the marker over the stream after receiving the markers over the plurality of streams.

17. The method of claim 10, further comprising receiving a command primitive from a virtual machine monitor, and wherein said determining and said starting are performed responsive to the command primitive.

18. The method of claim 10, wherein the stream is a counter-mode encrypted and authenticated stream, wherein the second protected VM is a trust domain, and further comprising maintaining state of the trust domain confidential from a virtual machine monitor of the second platform.

19. The method of claim 10, wherein the marker is encrypted with a migration capable key that is kept confidential from a virtual machine monitor (VMM).

20. The method of claim 10, further comprising importing a plurality of bundles of state, of the first protected VM, received at the second platform over a second stream, to a third protected VM of the second platform, when a migration policy of the first protected VM permits multiple instances of the first protected VM to be created.

21. A non-transitory machine-readable storage medium, the non-transitory machine-readable storage medium storing a plurality of instructions, the plurality of instructions, if executed by a machine, to cause the machine to perform operations comprising to:
enforce, in response to execution of control primitives by circuitry of a processor, that a plurality of bundles of state of a first protected virtual machine (VM), received at a second platform over a stream during an in-order phase of a migration of the first protected VM from a first platform to the second platform, are imported and stored to a memory of a second protected VM of the second platform, in a same order that the plurality of bundles of state were exported from the first protected VM;
determine whether all bundles of state exported from the first protected VM prior to export of a marker of an end of the in-order phase of the migration, which is to have been received over the stream, have been imported to the second protected VM; and
determine whether to start an out-of-order phase of the migration based on whether the determination is that said all bundles of the state exported from the first protected VM prior to export of the marker over the stream have been imported to the second protected VM.

22. The non-transitory machine-readable storage medium of claim 21, wherein the instructions to determine whether to start the out-of-order phase of the migration further comprise instructions that, if executed by the machine, are to cause the machine to perform operations comprising to:

determine to start the out-of-order phase of the migration upon a determination that said all bundles of the state exported from the first protected VM prior to export of the marker over the stream have been imported to the second protected VM.

23. The non-transitory machine-readable storage medium of claim 21, wherein the instructions to determine whether to start the out-of-order phase of the migration further comprise instructions that, if executed by the machine, are to cause the machine to perform operations comprising to:

determine to abort the migration upon a determination that said all bundles of the state exported from the first protected VM prior to export of the marker over the stream have not been imported to the second protected VM; and in response to determining to abort the migration, send an abort token to the first platform, the abort token to indicate that the first protected VM on the first platform is allowed to restart after its execution has stopped.

24. The non-transitory machine-readable storage medium of claim 21, wherein the instructions further comprise instructions that, if executed by the machine, are to cause the machine to perform operations comprising to:

allow, in the out-of-order phase of the migration, a second plurality of bundles of state to be imported to the second protected VM in a different order than an order the second plurality of bundles of state were exported from the first protected VM during the out-of-order phase of the migration.

25. The non-transitory machine-readable storage medium of claim 21, wherein the instructions further comprise instructions that, if executed by the machine, are to cause the machine to perform operations comprising to:

determine whether to start execution of the second protected VM based on whether the determination is that said all bundles of the state exported from the first protected VM prior to export of the marker over the stream have been imported to the second protected VM.

26. The non-transitory machine-readable storage medium of claim 21, wherein the instructions to said enforce further comprise instructions that, if executed by the machine, are to cause the machine to perform operations comprising to:

enforce values in the plurality of bundles of state, which are indicative of the order that the plurality of bundles of state were exported from the first protected VM, to be respectively consistent with values indicative of a number of the plurality of bundles of state imported into the second protected VM.

\* \* \* \* \*